Nov. 24, 1959
G. W. YARBER
2,914,359
ANTI-SKID BRAKE CONTROL SYSTEM
Filed Dec. 1, 1955
5 Sheets-Sheet 1
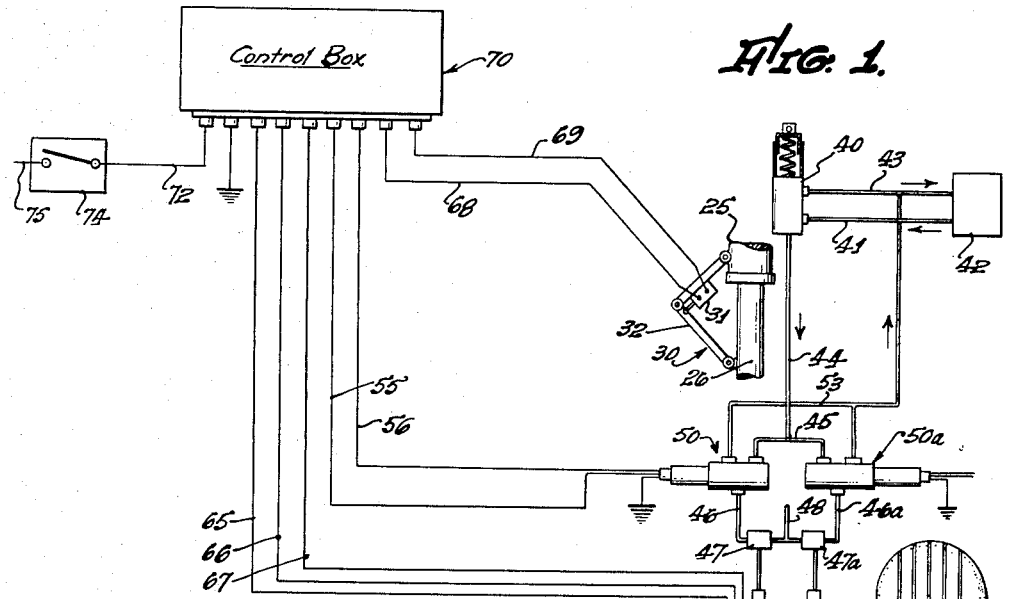
Fig. 1.
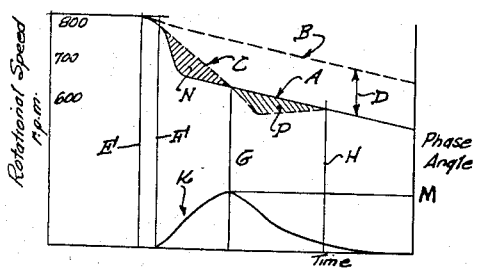
Fig. 13.
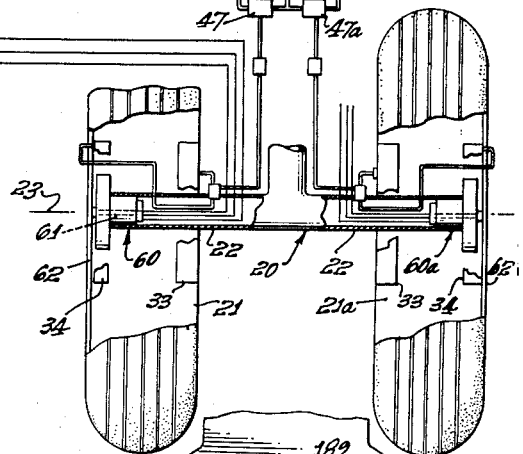
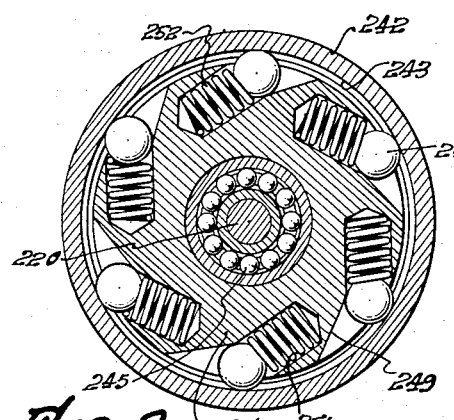
Fig. 8.
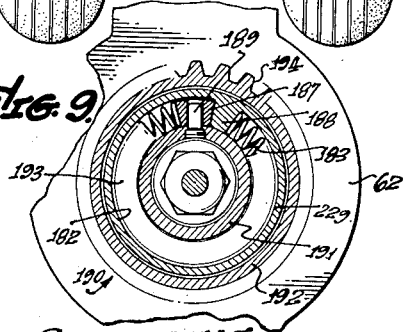
Fig. 9.
GORDON W. YARBER,
INVENTOR.
BY
Barkelew & Scantlebury
ATTORNEYS.

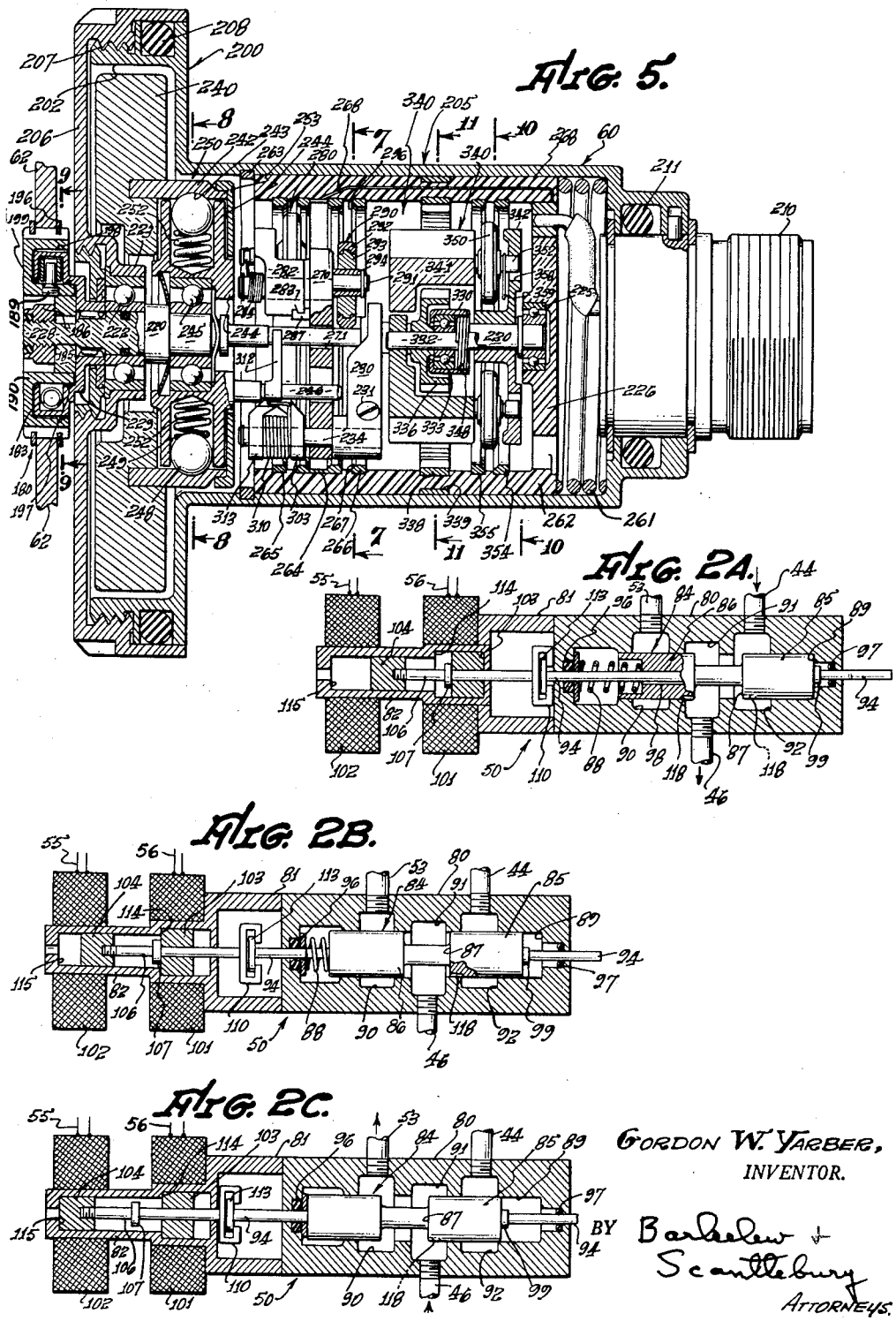

Nov. 24, 1959

G. W. YARBER 2,914,359

ANTI-SKID BRAKE CONTROL SYSTEM

Filed Dec. 1, 1955

INVENTOR.
GORDON W. YARBER,
BY
Barkelew & Scantlebury
ATTORNEYS.

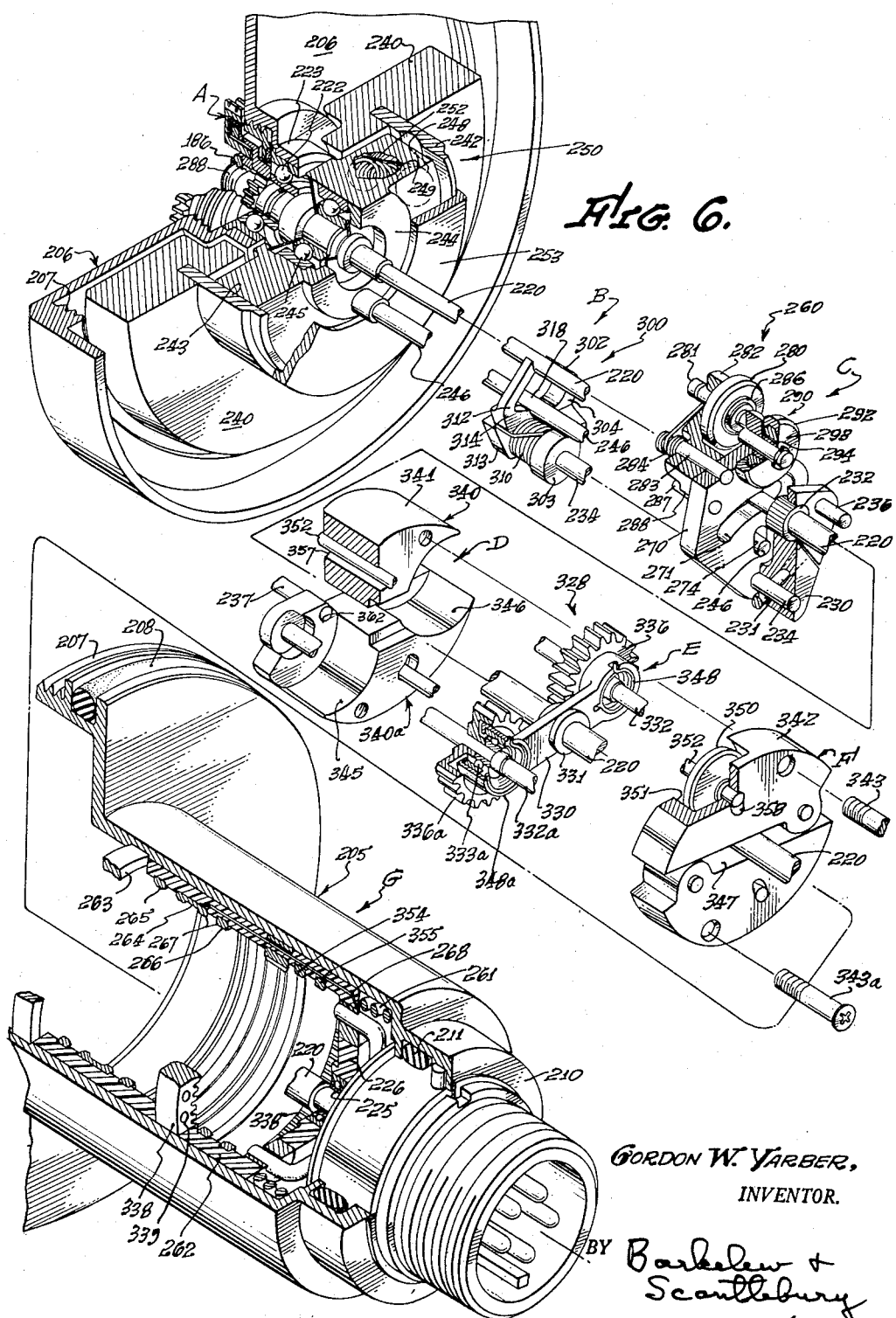

Nov. 24, 1959 G. W. YARBER 2,914,359
ANTI-SKID BRAKE CONTROL SYSTEM
Filed Dec. 1, 1955 5 Sheets-Sheet 5
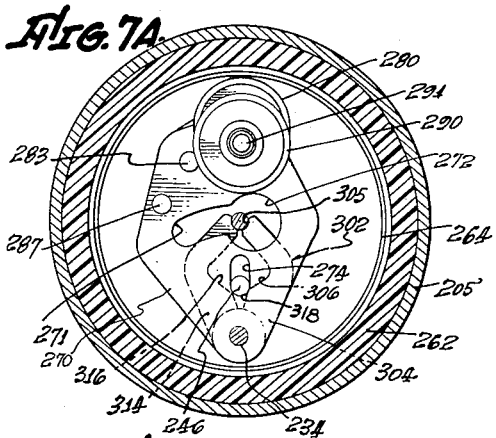
Fig. 7A.
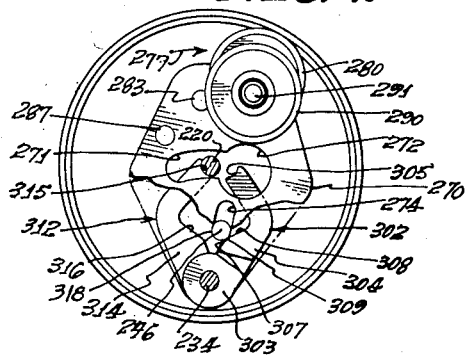
Fig. 7B.
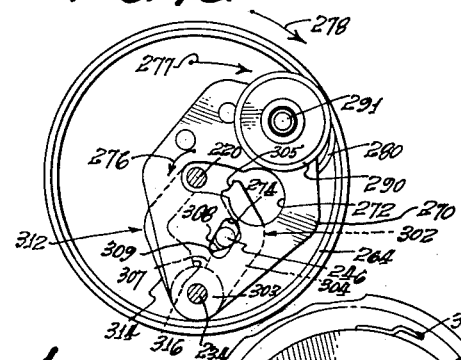
Fig. 7C.
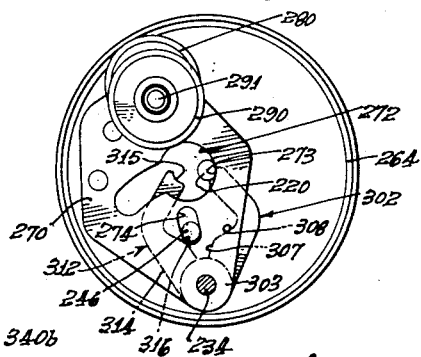
Fig. 7D.
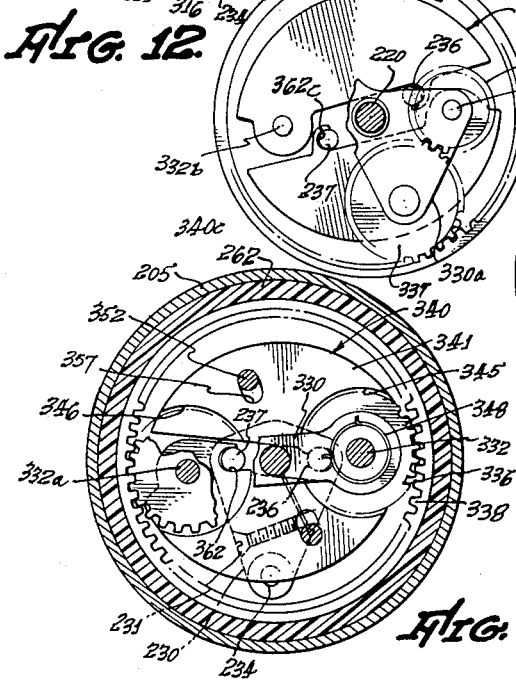
Fig. 12.
Fig. 11.
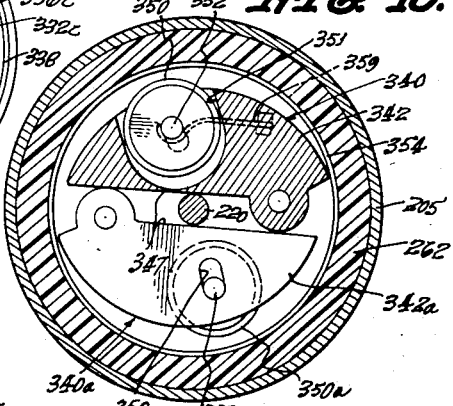
Fig. 10.
GORDON W. YARBER,
INVENTOR.
BY Barthelew + Scantlebury
ATTORNEYS.

2,914,359
ANTI-SKID BRAKE CONTROL SYSTEM

Gordon W. Yarber, Cornell, Calif.

Application December 1, 1955, Serial No. 550,351

24 Claims. (Cl. 303—24)

This invention has to do with control systems for vehicle wheel brakes for minimizing or preventing skids caused by excessive brake application. It is well known that the braking effectiveness of a skidding wheel is relatively low. It is therefore highly advantageous, whenever a skid is in progress or is about to occur, to relieve brake pressure until the wheel has recovered from the skid.

Skid control systems for automatically producing such brake control are useful on vehicles of many different types, including, for example, aircraft, railway trains and motor vehicles. Since the present invention provides a brake control system that is particularly well adapted for use on aircraft, it will be described primarily with reference to that illustrative field of use, but without thereby implying any limitation upon the invention, many aspects of which are useful also in other fields.

The invention pertains more particularly to brake control systems that employ sensing means responsive to the condition of wheel rotation and capable of detecting a condition characteristic of an early stage of wheel skid. A convenient indication of such an incipient skid condition is abnormally rapid wheel deceleration. An illustrative type of deceleration sensing mechanism comprises an inertial member, which will be referred to for convenience as a flywheel, a driving connection normally driving the flywheel in direct correspondence to the wheel speed, and sensing means responsive to the magnitude and direction of the driving torque transmitted by the driving connection. In such mechanism, a sudden decrease of wheel speed, for example, such as accompanies an incipient skid, causes the driving connection to exert on the flywheel an abnormally large negative torque. Such a torque may be caused to develop a signal which is then utilized to initiate reduction or release of the brake pressure.

An important general object of the invention is to provide skid sensing and brake control mechanism that is accurate and reliable in operation and yet may be lighter in weight and more compact than previous systems. In particular, the invention permits appreciable reduction of the moment of inertia of the flywheel without sacrifice of performance characteristics.

An important object of the invention is to permit practical operation of the means for detecting an incipient skid at a greater effective sensitivity than was previously feasible. Such increased sensitivity of the sensing means permits many skids to be corrected at an earlier stage than was previously possible, thereby maintaining more effective overall braking capacity.

The invention further takes account of an important characteristic of a wheel carrying a pneumatic tire, particularly the type of tire commonly employed in aircraft landing gear. When such a wheel rolls at a given linear speed over the ground, its rate of rotation when unbraked is appreciably faster than when normal braking is applied. That fact may be due, in part, to progressive distortion of the flexible tire under the stress of braking and in part to actual slipping of the tire on the ground. However, such slipping, if it occurs, is characteristic of normal braking and is clearly distinct from the type of slipping associated with an incipient or actual skid condition. Because of the effect just described, when a freely rolling rubber-tired wheel is first braked its rotational speed shifts relatively abruptly from the free-rolling value, corresponding directly to the linear speed relative to the ground, to a lower value characteristic of normal braked condition. As an illustration, the free-rolling and braked speeds may differ in practice by as much as ten percent, or even more, depending upon such factors as loading, tire construction, tire pressure and braking torque. If the brake is applied abruptly, that shift of wheel speed takes place correspondingly rapidly. The initial wheel deceleration is also affected by flexibility of the landing gear of the aircraft. The result is typically a rather rapid wheel deceleration at initial brake application. However, that initial rapid deceleration typically persists for only a very short time before the wheel reaches its normal braked speed of rotation, after which, in absence of a skid, wheel deceleration corresponds to deceleration of the vehicle.

In previous skid-sensing systems of the inertial type, especially when employed with rubber-tired wheels, it has been difficult or impossible to provide adequate sensitivity of response for checking incipient skids at an early stage without occasionally causing brake release unnecessarily in response to the momentary wheel deceleration that normally accompanies brake application. In accordance with the present aspect of the invention, that difficulty may be avoided by providing a sensing mechanism that produces two distinct types of skid signal, a first relatively sensitive signal that responds essentially to the magnitude of any abnormally large wheel deceleration, and a second relatively insensitive skid signal that responds essentially to the value of the time integral of such deceleration. That type of signal response may be produced, for example, by providing in the flywheel drive a yielding coupling that is deflectable only in response to an abnormally large deceleration exceeding a predetermined critical value. A first signal may then be developed in response to initial deflection of the coupling through a small phase angle, so that the first signal essentially represents existence of a rate of deceleration exceeding the critical rate. A second signal may be developed only after the deflection phase angle has reached a relatively large value, corresponding to the time integral of the deceleration. More accurately, the threshhold for such a second signal is a definite predetermined value of the double time integral of the excess of the actual wheel deceleration over the critical deceleration.

The first signal then typically detects an incipient skid at an early stage, and may ocassionally respond also to the momentary wheel deceleration that typically accompanies normal brake application. The second signal, on the other hand, is effectively insensitive to that normal momentary deceleration, for although the magnitude of such deceleration may be high, its duration is so short that its time integral does not reach the threshhold required to produce a signal. But whenever an incipient skid persists, the time integral of the accompanying wheel deceleration soon exceeds that threshold, producing a signal of the second type.

The first signal is preferably arranged to produce a relatively mild type of brake control action, typically arresting further increase of brake pressure; while the second signal produces a stronger type of brake action, typically releasing the brake pressure. The first signal is then frequently effective to check an incipient skid at an early stage. Occasional production of a first signal during normal brake application does not interfere seriously with effective braking because of the relatively mild nature of the control action. The second signal is effectively insensitive to normal brake application, regardless of the magnitude of the accompanying momentary deceleration, yet responds positively to continuation of a skid condition, even though the magnitude of the associated deceleration is only slightly greater than normal.

In accordance with a further aspect of the invention, the first signal may be arranged to produce a modified type of brake arresting action, in which the brake is not completely cut off from the source of pressure, but is permitted to increase at a relatively slow rate. With that type of control, it is feasible to operate the sensing mechanism at increased sensitivity, even including development of a first signal in response to rates of wheel deceleration within the range of normal vehicle deceleration. That type of system operation is especially effective when there is graduated control of the source pressure supplied to the system during the course of the landing run.

The invention further provides novel mechanism of the inertial type responsive to wheel acceleration and deceleration and capable of functioning in a novel and useful manner. The invention provides a signaling mechanism that incorporates a self-energizing principle. The signal is developed by deflection of a physical element to a signaling position. The self-energizing action tends to maintain signaling position of the element by means of energy derived from the wheel, rather than from the inertial element. Hence, the moment of inertia of the inertial element may be appreciably smaller than in comparable mechanisms of conventional type.

Moreover, the self-energizing or regenerative action of the sensing mechanism may be utilized in accordance with the invention to control the effective sensitivity of the mechanism as a function of certain factors of operation.

In one form of the invention, such sensing means may be made more sensitive, for example, to an incipient skid condition when that condition first occurs during a landing, and may be made to respond with less sensitivity to closely spaced recurrences of that condition. A further aspect of the invention provides mechanism in which the initial sensitivity is greater, for example, at relatively high wheel speeds than at lower wheel speeds.

A further aspect of the invention concerns a yielding driving connection of improved type for driving the flywheel and for sensing abnormal rates of wheel acceleration. The yielding action of that connection is preferably controlled by deflection of a cam member, permitting improved control of the relation between restoring force and deflection of the driving connection. Such control is particularly advantageous when two signals are to be developed in response to different functions of wheel movement.

The invention further provides improved means for obtaining optimum response of the flywheel to variations of wheel movement without permitting the development of harmful oscillations in the driving train. During the relatively rapid wheel decelerations that typically accompany a wheel skid, and which may even reduce the wheel speed to zero, it is desirable to permit the flywheel to over-run the wheel as freely as possible, consistent with reliable development of a control signal. On the other hand, when the wheel is accelerated rapidly, as upon recovery from a skid, it is desirable that the flywheel return to normal speed as rapidly as possible. That is particularly true with a control system of the presently preferred type, in which the brake is reapplied only after the wheel has recovered substantially completely from the skid. It has not previously been feasible to combine in a single system substantially positive forward drive of the flywheel and satisfactorily sensitive response of the system to a skid condition, primarily because the relatively high torque involved in rapid flywheel acceleration tended to produce oscillations of the system and to give false skid signals. That difficulty is overcome in accordance with the present invention by providing in the driving train an additional yielding coupling that is relatively stiff compared to the skid detecting yielding linkage and that includes damping means for the effective suppression of oscillations.

The invention further provides an improved type of over-running clutch adapted for driving the flywheel substantially positively in the forward direction and for accurately controlling the magnitude of the torque that can be transmitted from the flywheel during wheel deceleration. The torque-limiting clutch mechanism of the invention is entirely smooth in operation and substantially free of wear. A further advantage of the novel clutch structure in preferred form is that, when employed to drive a flywheel in an acceleration sensing mechanism, the clutch structure itself may constitute part or all of the bearing support for the flywheel.

Another aspect of the invention relates to sensing means for discriminating a condition of zero wheel rotation. Previously available rotation sensing means of mechanical type have been incapable of responding to very low speeds of rotation. In accordance with the present invention, a remarkably sensitive mechanical device is provided for sensing low rotational speeds. In preferred form of that device, it is sensitive to acceleration as well as to the magnitude of the speed. Such a device is capable of responding to a particularly low speed if that speed is increasing. Moreover, in a device employing pivoted centrifugal masses, means are provided for substantially eliminating rest friction at the pivot bearings of the masses.

A full understanding of the invention and of its further objects and advantages will be had from the following description of certain illustrative manners of carrying it out. The embodiments of the invention that are described in this specification and in the accompanying drawings are intended only as illustration and not as a limitation upon the scope of the invention. It will be understood that many changes may be made in the particular mechanisms described without departing from the proper scope of the invention, which is defined in the appended claims.

In the drawings:

Fig. 1 is a schematic diagram representing an illustrative system in accordance with the invention, as it may be installed in an aircraft;

Figs. 2A, 2B and 2C are corresponding axial sections representing an illustrative control valve in three different phases of operation;

Fig. 5 is a generally axial section of an illustrative sensing unit in accordance with the invention, the section departing locally from an axial plane for clarity of illustration;

Fig. 6 is an exploded perspective, partly broken away, corresponding to Fig. 5;

Figs. 7A, 7B, 7C and 7D are corresponding transverse sections taken generally on line 7—7 of Fig. 5 and showing the mechanism in four respective phases of operation;

Fig. 8 is a transverse section on line 8—8 of Fig. 5;

Fig. 9 is a transverse section on line 9—9 of Fig. 5;

Fig. 10 is a transverse section on line 10—10 of Fig. 5;

Fig. 11 is a transverse section on line 11—11 of Fig. 5;

Fig. 12 is a transverse section corresponding generally to Fig. 11, but representing a modification; and Fig. 13 is a schematic diagram illustrating certain aspects of normal behavior of a pneumatic-tired wheel at initial brake application.

Brake control system

Figure 3:
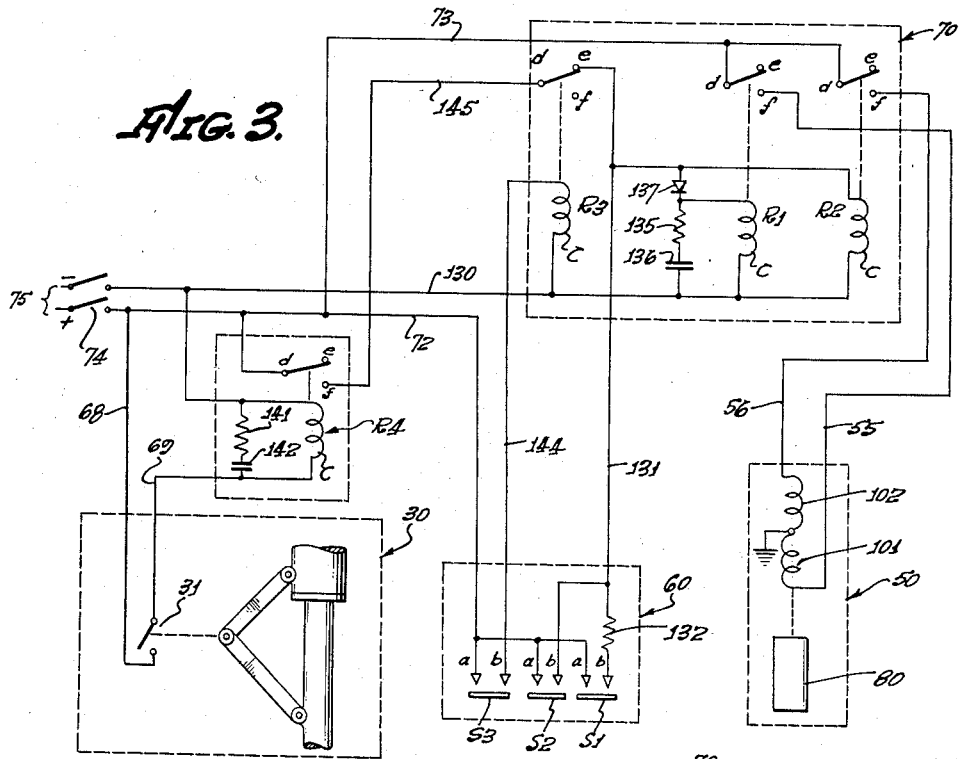
Fig. 3 is a schematic diagram representing an illustrative electrical system adapted for use with the invention.

In the illustrative brake control system represented schematically in Fig. 1, a portion of a typical aircraft landing gear frame is indicated at 20 with two wheels 21 and 21a independently journaled on the axle 22 on a common axis 23. Frame 20 is mounted in any suitable manner on the main frame of the aircraft, indicated fragmentarily at 25. For example, landing gear frame 20 may include a vertical post 26 which is received telescopically by frame member 25 and is urged downward by resilient means such as air pressure acting on a piston. In flight of the aircraft, post 26 is relatively extended. Upon landing, the weight of the aircraft forces post 26 inward against resilient pressure. That movement may be utilized to develop a signal that represents the condition of flight of the aircraft. For example, a flight sensing mechanism 30 may comprise a landing gear switch 31 actuated by a scissors linkage 32 in such a way that the switch is closed in flight and is open when the wheels are on the ground.

As shown in Fig. 1, each of the wheels 21 and 21a is provided with inboard and outboard brakes 33 and 34, respectively, which are represented illustratively as hydraulically operated brakes. The primary control of all four of those brakes typically comprises a single brake metering valve 40, which may be controlled manually or otherwise. Hydraulic fluid under pressure is supplied to valve 40 via a pressure line 41 from a pump or other suitable source, indicated at 42. Under control of valve 40, pressure from line 41 may be directed into a brake supply line 44 to normally apply the brakes, or line 44 may be connected to a low pressure return line 43 to release the brakes. Brake supply line 44 preferably branches, as at 45, and leads via separate skid-control valves 50 and 50a and lines 46 and 46a to the brakes of the respective wheels 21 and 21a. Shuttle valves 47 and 47a may be provided in lines 45 and 45a to permit supply of pressure to the brakes from an emergency pressure line indicated at 48. Alternatively, as will be described in further detail, a single skid-control valve may be employed to control the brakes of two or more wheels. Valve 50a may then be omitted, valve 50 may be inserted directly in line 44. A large aircraft typically has two or more sets of wheels all of which may have brakes controlled by the same main metering valve 40. Each set of wheels, and preferably each wheel, may then be provided with a distinct skid-control mechanism, that to be described being illustrative.

In accordance with the present invention, skid-control valve 50 (and 50a, if used) is capable of three alternative conditions: a normal condition in which fluid pressure is transmitted from line 44 to line 46 and thereby to the wheel 21 to apply the brakes; a brake arresting condition, in which fluid pressure from line 44 is largely or wholly cut off from line 46, so that whatever pressure exists in the latter line is not appreciably (or not at all) increased; and a brake releasing condition, in which fluid pressure in line 46 is transmitted to a low pressure return line 53, which may join return line 43 as shown, thereby releasing the brakes. In brake arresting condition of valve 50, pressure from line 46 may be allowed to bleed at a moderate rate to return line 53 or may be slowly increased by fluid flow from line 44, thereby progressively reducing or increasing the effective braking pressure. Thus, the term "brake arresting condition" is intended, unless otherwise indicated, to embrace a range of alternative conditions in which the braking pressure may be held stationary or may be allowed either to increase or to decrease at a moderate rate. However, that condition is characterized by the fact that the braking pressure remains relatively constant by comparison with the rates of pressure increase and decrease encountered in normal brake operation and release. For conciseness and clarity of description, it will be convenient to speak of the brake arresting condition as if the braking pressure were held strictly stationary, but that is not necessarily the case. Valve 50 is to be considered representative of any type of control mechanism capable of three conditions in which braking action is applied, substantially held, and released, respectively, regardless of the medium or detailed mechanism by which the braking force may be transmitted.

It will be understood that in the present embodiment of the invention, action of skid-control valve 50 or its equivalent is subordinate to main metering valve 40, in the sense that brakes can be applied only if the main valve is in braking condition. But even in that condition of the metering valve, normally effective brake actuation can occur only if skid-control valve 50 is in its normal brake applying condition.

In accordance with the invention, skid-control valve 50 is shifted among its three alternative conditions in response to the instant condition of rotation of the wheel (or wheels) to be braked. In preferred form of the invention, the control is shifted from normal to brake arresting condition in response to a wheel condition that represents a relatively mild tendency toward a skid; and is shifted to brake releasing condition in response to a wheel condition that represents a greater tendency toward a skid. Those two types of control action will be referred to collectively as relieving the brake. Means are provided for returning the control valve to normal condition from either type of actuated condition when the wheel has substantially recovered from the incipient skid condition.

The described operation of skid-control valve 50 may be produced by many types of mechanism. In the present illustrative embodiment, a wheel skid sensing unit 60, which includes a shaft 61 driven in direct accordance with the wheel speed, is adapted to produce a variety of control signals in response to predetermined respective conditions of wheel rotation. The sensing mechanism may be mounted at any convenient place in the aircraft, a suitable driving connection being provided from the wheel, as by a mechanical linkage or a selsyn drive system, for example. Such a drive may include any desired speed ratio, as by a gear box of conventional type. However, it is preferred that sensing unit 60 is mounted on landing gear frame 20 coaxially of wheel axis 23 and at the outboard end of the wheel axle, and that its shaft 61 is directly connected mechanically to the wheel, as by a drive strap 62 extending diametrally of the wheel. Although any suitable criteria of skid condition may be employed, it is preferred that sensing unit 60 develops a first skid signal in response to a first predetermined condition of wheel deceleration which corresponds to a momentary and relatively mild incipient skid condition; and develops a second skid signal in response to a second predetermined condition of wheel deceleration which corresponds to a stronger and continuing skid condition. Those signals are typically electrical in nature, and may control valve means 50 either directly or via control mechanism that may involve other control factors as may be desired.

As illustrated, a control unit 70, which may be mounted at any convenient position in the aircraft, receives the described signals from sensing unit 60 via lines indicated schematically at 65 and 66, and develops corresponding valve controlling signals on output lines 55 and 56 which lead to skid-control valve 50. For example, positive voltages supplied to valve 50 via lines 55 and 56, may shift the valve to brake arresting and brake releasing conditions, respectively, while absence of both signals may cause the valve to return to normal position. A preferred type of control valve operating in that illustrative manner will be described. Control unit 70 is provided with electrical power from a suitable source 75 via a line 72 and a shut-off switch 74, which may be opened to put the entire anti-skid control system out of operation, thereby restoring the brakes to normal control by metering valve 40 alone.

In preferred form of sensing unit 60, as thus far described, the first signal is preferably developed promptly whenever the wheel speed decreases faster than a critical value which exceeds the value corresponding to normal deceleration of the aircraft; whereas the second signal is developed only after such wheel deceleration has continued at abnormal rate for an appreciable period of time. More particularly, the second signal is developed essentially in response to a predetermined value of the time integral of the difference between the actual wheel speed and a nominal speed based on the critical value of deceleration already mentioned. As will be more fully explained, the critical value of that time integral is so selected as to exceed by a comfortable margin the maximum value of the corresponding time integral during the momentary wheel deceleration that normally occurs for the wheel and tire in question in response to brake application.

Sensing unit 60 may also develop one or more further signals, which may represent additional conditions of wheel rotation and which may be supplied to control unit 70 via additional lines, such as line 67. An illustrative and preferred type of mechanism for developing an additional signal representing wheel rotation will be described. Furthermore, a signal is preferably supplied to control unit 70 from landing gear switch 30, as via the lines 68 and 69, which signal represents the condition of flight of the aircraft, as already explained. In the preferred embodiment of the invention to be described, primary control of skid-control valve 50 is exerted by the first and second skid signals on lines 65 and 66, while that primary control is preferably modified in a manner to be illustratively described in response to the rotation signal on line 67 and to the flight signal on lines 68 and 69. If desired, the operation of valve 50 may be further conditioned upon other factors in a similar manner.

The described type of brake control has the great advantage over previously available skid-control systems that the wheel is frequently permitted to recover from an incipient skid without actual release of the brake. For, at the first indication of a skid, shifting of the control to brake arresting condition stops further appreciable increase of braking pressure, while permitting the existing braking action to continue. That continuing action, although strong enough to produce a mild incipient skid condition, is frequently not strong enough to cause that condition to develop into an actual skid. When that is the case, the wheel typically continues to be effectively braked, and gradually recovers normal speed. Such recovery is greatly aided during aircraft landing by the fact that the wheel loading increases rapidly as speed and lift decrease, so that a braking pressure that was slightly excessive at one moment tends to become appropriate to the wheel loading a moment later.

After the wheel has substantially recovered from an incipient skid in the manner just described, the skid-control valve is automatically returned to normal condition. Braking pressure is then again progressively increased due to fluid flow through metering control valve 40. That increase typically rapidly overtakes the relatively slow increase in wheel loading. A second mild incipient skid condition may then occur, again causing the skid-control valve to be shifted momentarily to brake arresting condition. Such a cycle of operation may recur several times, causing the braking pressure to increase step-wise in close correspondence to the progressive increase of wheel loading. The brakes are thereby permitted to act continuously and with substantially maximum effectiveness at each instant.

Whenever the wheel fails to recover from a mild incipient skid condition in the manner just described, but instead approaches more closely an actual skid condition, the skid-control valve is shifted automatically from brake arresting to brake releasing condition. Braking pressure is thereby sharply reduced, leading promptly and reliably to recovery of the wheel.

The availability of that second stage of control, which comes into action automatically whenever the first stage for any reason fails to prevent a skid, provides valuable flexibility to the system. Since the first stage is not relied upon ultimately to prevent skidding, its action may be relatively mild, as already indicated, so that it produces a minimum of interference with braking action in those instances when a skid does not develop. And because of that relatively mild nature of the first stage action, its control may in practice be made relatively sensitive. For example, the system may be arranged to initiate the first stage of control promptly in response to a rate of wheel deceleration only slightly greater than normal. Many incipient skids can be checked at an early stage by virtue of that sensitivity of control; and even if control action is occasionally initiated when not actually required, braking action is not appreciably disturbed.

Furthermore, particularly when the first stage of control action permits gradual increase of the braking pressure, the first stage signal may be developed in response to an even lower critical rate of wheel deceleration. That critical rate may, for example, correspond to a rate of vehicle deceleration that normally occurs during the latter portion of the run after the wheel loading is high enough to produce fully effective braking; but that does not occur early in the run. With that typical arrangement, the first signal, when it occurs during the first part of the run, ordinarily represents an incipient skid condition, and the control system operates in substantially the manner already described. During the latter portion of the run, the first signal may be produced even in absence of an incipient skid, when braking pressure reaches a value sufficient to produce vehicle deceleration at the selected critical rate. The signal then operates to limit the rate of increase of brake pressure to the rate predetermined by the bypass design. For the described type of operation, that rate of increase is preferably approximately equal to, or somewhat greater than, the rate at which the brake pressure that just produces a skid increases due to increased loading of the wheels. The bypass may typically permit the brake pressure to increase by from 2% to 8% per second.

It has been found in practice that the second stage of control tends to be called into action relatively frequently immediately after touchdown, when the aircraft speed is still relatively high and the wheel loading is correspondingly low; and tends to be required less frequently as the aircraft settles down and the braking pressure approaches closer to its maximum value, as set, for example, by available pressure or by adjustment of main metering valve 40. The improved smoothness and uniformity of braking action provided by the present aspect of the invention is therefore most evident during the latter period, when potential braking power is relatively high and optimum use of that power is correspondingly important.

Brake control valve

An illustrative type of skid-control valve for use at 50 in accordance with the invention is shown schematically in three conditions of operation in Figs. 2A, 2B and 2C. It comprises a frame which includes a valve cylinder 80 and a solenoid guide tube 82 rigidly connected by the frame member 81. Valve cylinder 80 has a cylindrical bore which is provided with three spaced annular recesses 90, 91 and 92. Brake supply line 46, which carries braking pressure to the wheel brake, communicates with the central recess 91. Pressure line 44 from metering valve 40 communicates with recess 92, which will be referred to as the inner recess; and return line 53 similarly communicates with outer recess 90.

A valve piston 84 is axially reciprocable in cylinder 80, and is yieldingly urged inwardly (to the right as seen in Fig. 2) as by the coil spring 88, toward the normal position shown in Fig. 2A. That position may be defined by the axially facing shoulder 89, acting as a positive stop for the piston. A valve operating rod 94 is slidable in a coaxial bore in the outer end wall of valve cylinder 80, suitable sealing means, such as the O-ring 96, being provided. Rod 94 passes coaxially through valve piston 84 and is slidable in a bore in the inner wall of cylinder 80, in which a sealing O-ring 97 is indicated. A longitudinal channel 98 through the piston insures balance of pressures at the piston ends. Rod 94 may carry a fixed collar 99 at the inner end of piston 84, which enables the rod to displace the piston against the force of spring 88.

The valve piston is movable outwardly against the force of spring 88 by energization of the first and second solenoid coils 101 and 102, respectively. Those coils are coaxially mounted on guide tube 82 in axially spaced relation, and actuate the respective armatures 103 and 104, which are axially slidable within the tube. A solenoid rod 106 is rigidly connected to armature 104 and extends freely through a coaxial bore in armature 103. Its other end is connected to valve operating rod 94, as by the cage 110 carried by rod 106 and receiving a head 113 on rod 94. Outward axial movement of solenoid rod 106 is thus transmitted positively to rod 94 and piston 84 without exerting upon the latter any transverse forces. Solenoid rod 106 carries a radial flange 107 outward of first armature 103. Energization of first solenoid 101 draws armature 103 outwardly, engaging flange 107 and carrying rod 106 and valve piston 84 with it to a definite position (Fig. 2B) defined by a positive stop. As shown, that stop is provided by an axially facing inner shoulder 114 formed on tube 82 and engaging the armature. Energization of second solenoid 102 draws its armature 104 outwardly against a second positive stop, provided by shoulder 115, moving piston 84 to the definite position represented in Fig. 2C. During that motion, rod 106 slides freely through first armature 103. Spring 88 is compressed by the described piston movements, and returns the piston to its normal position upon deenergization of the solenoids.

Valve piston 84 comprises inner and outer cylindrical portions 85 and 86, respectively, separated by an annular channel 87. In inner position of the piston (Fig. 2A), which corresponds to normal or idle condition of the valve, channel 87 forms a fluid connection between pressure line 44 and brake supply line 46; while outer portion 86 of the piston isolates return line 53. In that position of the valve, brake control is not affected by the anti-skid system. In intermediate position of the piston (Fig. 2B), which is produced by energization of first solenoid 101, and which corresponds to brake arresting condition of the valve, the cylindrical portions of the piston typically isolate brake supply line 46 from both pressure line 44 and from return line 53, maintaining the effective brake pressure substantially constant. In outer position of the piston (Fig. 2C), which is produced by energization of second solenoid 102, and which corresponds to brake releasing condition of the valve, inner piston portion 85 isolates pressure line 44, while channel 87 provides a fluid connection between brake supply line 46 and return line 53, releasing the brake.

As already indicated, it may be desired in intermediate position of the valve to provide a bypass fluid connection that permits relatively slight fluid flow between brake supply line 46 and either pressure line 44 or return line 53, in order to produce gradual increase or decrease of braking pressure when the system is in brake arresting condition. That may be accomplished, for example, by providing one or more axial grooves of appropriate depth in that portion of the cylindrical wall of the valve piston adjacent annular channel 87 on one side or the other according to the action desired. Such a channel is indicated at 118 in position to cause gradual increase of braking pressure in brake arresting condition of the system. By suitably limiting the length of channel 118, it may be made ineffective when the piston is at either extreme position. As already mentioned, channel 118 or its equivalent is preferably of such dimensions as to permit the brake pressure to increase by from about 2% to about 8% per second when the first control signal is to be made so sensitive as to operate during normal braking in the latter portions of the aircraft run.

Whereas it is preferred to provide the described valving functions by means of a unified structure, such as that illustratively described, it will be understood that any other suitable type of mechanism may be employed.

*Electrical control circuit*

Illustrative control circuit means are shown schematically in Fig. 3, by which skid-control valve 50 may be actuated in accordance with the invention. Valve 50 is represented as comprising the valve proper 80 and first and second valve-actuating solenoids 101 and 102, respectively, typical detailed operation of which has already been explained. Electrical control lines 55 and 56 between valve 50 and control unit 70 are connected directly to end terminals of the respective solenoid coils 101 and 102, the opposite end terminals of both coils being grounded. The four single pole relays R1, R2, R3 and R4, are shown in idle position. One terminal of each relay coil c is connected via line 130 and main shut-off switch 74 to the negative side of the power source 75. The positive power line 72 is connected via line 73 to the switch armatures d of relays R1 and R2. The normally open switch contacts f of relays R1 and R2 are connected via lines 55 and 56, respectively, to the positive terminals of first and second solenoids 101 and 102. Control unit 70 is indicated as including relays R1, R2 and R3, and may also include relay R4 and its associated circuitry.

Sensing mechanism 60 is indicated as comprising three switches S1, S2 and S3, each consisting of a and b switch terminals connectible by movement of a switch armature. The a terminal of each switch is supplied with electrical power from line 72. The respective armatures of the switches are automatically controlled in response to wheel rotation, as by illustrative mechanism to be described, in such a way that S1 closes in response to a mild incipient skid, S2 closes in response to a stronger incipient skid, and S3 is actuated, as by a centrifugal device, in such manner that it closes in response to wheel rotation. In accordance with a further aspect of the invention, switch S3 may be controlled, for example, by a novel centrifugal mechanism to be described which responds to both velocity and acceleration of the wheel in such a way that as the wheel slows down the switch opens at a relatively high wheel speed; and as the wheel speeds up the switch closes at a relatively low wheel speed. Switch S1 is preferably arranged to close not only during an incipient skid, but also during the process of recovery from a skid. Typical mechanism for producing such switch operation will be described.

Sensing switches S1 and S2 are arranged to actuate the respective relays R1 and R2. As illustrated, a single line 131 is connected between the positive terminals of both relay coils and the b terminals of switches S1 and S2, but with a resistance 132 inserted between line 131 and switch S1, and with a rectifier 137 inserted between line 131 and the coil of relay R1 (see below). Relay R1 is selected to operate on a lower voltage than R2, so that upon closure of S1 the voltage applied via resistance 132 is sufficient to actuate R1 but not R2. Closure of S2 then shunts resistance 132 and thereby applies the full line voltage to line 131, actuating R2 also. Accordingly, in normal operation of the system, closure of S1 energizes only first solenoid 101 via relay R1 and shifts skid-control valve 50 to brake arresting condition; while closure of S2 energizes also second solenoid 102 via relay R2 and shifts the valve to brake releasing condition.

Means are preferably provided to produce a controlled time delay in release of the relay R1 upon opening of S1. (For clarity of explanation, S2 may be considered to be always open at the time S1 opens, as is typically true in practice.) For example, a series-connected resistance 135 and capacitor 136 may be connected in shunt to the coil of relay R1. The time delay circuit for R1 may be effectively isolated from R2 by insertion of the rectifier 137 as indicated between line 131 and the connection between the positive side of R1 and its shunt circuit. The resulting time delay in release of R1, which may amount to from 0.1 to 0.2 second, for example, permits S1 to open momentarily and close again without release of R1. That type of action is particularly useful when switch S1 is arranged to close both during an incipient skid and during recovery from a skid, since the switch may then be permitted to open momentarily as recovery is initiated without releasing R1. Skid-control valve 50 is then held by continued energization of solenoid 101 in brake arresting condition substantially throughout recovery of the wheel. When the wheel has regained substantially normal speed, S1 opens, releasing relay R1. The time delay circuit already described causes a slight delay in the latter action, which may be desirable to insure full recovery of the wheel before re-application of the brakes. But it is ordinarily preferred to select the delay time substantially at the minimum necessary to insure continuous relay operation at the transition between skid and recovery conditions.

In addition to the described actuation of skid-control valve 50 in response to conditions of wheel rotation representing an incipient skid, it is desirable to provide means for preventing brake application under certain conditions when wheel rotation has stopped entirely. For example, application of any appreciable brake pressure before touchdown tends to lock the wheels and prevents them from being accelerated to speed when they first strike the runway. So long as the wheels remain in locked condition, the regular skid sensing mechanism is inoperative, since it typically depends for operation upon changes in wheel speed that correspond to an incipient skid. It is therefore desirable to prevent brake application until after touchdown and until the wheel has reached sufficient speed for effective operation of the primary sensing means.

In the illustrative system of Fig. 3, such secondary control is exercised by cooperative action of flight switch 31 and centrifugally controlled switch S3. Flight switch 31 is connected via the lines 68 and 69 between positive power line 72 and the positive coil terminal of relay R4, so that the relay is actuated whenever the landing gear is free of the ground. Actuation of relay R4 connects the line 145 directly to positive supply line 72. A time delay circuit is preferably provided, shown as the resistance 141 and capacitance 142 series-connected in shunt to the relay coil, to delay release of the relay when switch 31 opens. That delay is preferably made long enough not only to allow the wheel to reach substantial speed after touchdown, which is typically accomplished in a time of the order of one second; but also to hold relay R4 actuated during the first portion of the landing, typically lasting 5 to 10 seconds, until the aircraft has settled down to a uniform run with appreciable and reasonably steady load on all of its braked wheels. Such prolongation of relay actuation after initial touchdown extends control conditions appropriate to flight through the initial phase of landing. That is desirable since it is during that initial phase of landing the one or more wheels are likely to lift momentarily free of the ground.

Centrifugally controlled switch S3 has its $a$ contact connected to power line 72, as already mentioned. Its $b$ contact is connected via line 144 to the positive coil terminal of relay R3. The relay is thereby idled at substantially zero wheel speed, but is actuated whenever the wheel rotates at appreciable speed. The switch armature $d$ of R3 is connected to line 145, and its normally closed switch contact $e$ is connected to line 131, already described. Line 131 is thereby supplied with the full voltage of positive power line 72 via the two relay switches R3 and R4 in series whenever R3 is idle and R4 is actuated. That condition exists whenever the wheel is substantially stationary and also either carries zero load or has carried zero load within the set preceding time period determined by the release delay of relay R4. Under that combination of conditions, relays R1 and R2 are both actuated, energizing solenoids 101 and 102 and shifting skid-control valve 50 to brake releasing condition. On the other hand, after elapse of the delay period of relay R4 following touchdown, or during appreciable wheel rotation at any time, the described actuating circuit is open at R4 or at R3, and skid-control valve 50 is controlled entirely by switches S1 and S2 in the manner already described.

Figure 4:
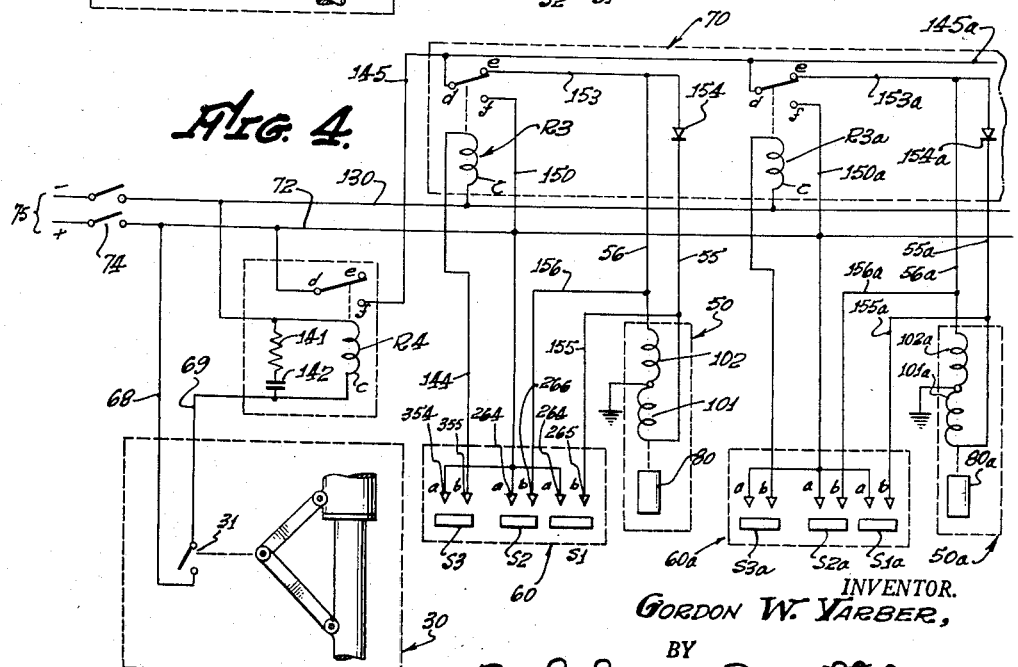
Fig. 4 is a schematic diagram representing another illustrative electrical system.

It will be understood that when additional wheels are to be controlled, additional control mechanism and circuitry may be provided, for example as illustrated explicitly in Fig. 4, to be described. For economy of instrumentation it is convenient to utilize the same flight sensing mechanism 30 and relay R4 for all wheels, or for all wheels that are mounted on a common landing gear frame (Fig. 1). Line 145 from the switch of the common relay R4 may then be connected to the switch armatures of relays R3 for all the wheels to be thus controlled.

Fig. 4 represents a modified control system in which switches S1 and S2 operate the respective solenoids 101 and 102 directly without interposition of relays such as R1 and R2 of Fig. 3. Fig. 4 further illustrates a particularly useful type of interaction among the several wheels of the aircraft with respect to the action of switches S3. Circuitry is shown for controlling two wheels, parts provided in duplicate for the second wheel being designated by addition of the letter $a$ to the identifying numeral. It will be understood that similar provision may be made for any number of wheels.

Flight sensing device 30, relay R4 and the associated circuits which they control may be identical with the elements so designated and already described in connection with Fig. 3. Output line 145 from the switch of relay R4 is shown in Fig. 4 connected to the switch armatures $d$ of relays R3 and R3a, corresponding to two of the aircraft wheels, and it may extend at 145a to corresponding switches for further wheels.

The $b$ contacts of switches S1 and S2 in Fig. 4 are connected directly to the positive terminals of first and second solenoids 101 and 102 via the lines 155, 55 and 156, 56, respectively. Contact $b$ of switch S3 is connected via line 144 to the coil $c$ of relay R3, as before. The normally closed contact $e$ of that relay switch is connected via a line 153 to both solenoid lines 55 and 56, a rectifier 154 being inserted between lines 153 and 55 to block current flow from switch S1 to second solenoid 102. That connection causes R3 to energize the valve solenoids as already described in connection with Fig. 3.

In the system of Fig. 4 further connections are provided, as shown at 150, 150a, between the positive power line 72 and the normally open switch contacts $f$ of relays R3, R3a, respectively. Power is thereby supplied to line 145 via one or more of the relays R3, and independently of flight condition relay R4, whenever at least one wheel is rotating at sufficient speed to close its switch S3. With power thus supplied to line 145, opening of the switch S3 for any wheel, in response to substantially zero rotation of that wheel, energizes the valve solenoids for that wheel, releasing the brakes. Thus, even after relay R4 has released following touchdown, the brakes are released on any wheel that substantially stops rotating provided some other wheel is rotating. If, after R4 has released, all wheels stop, line 145 receives no power, and the valve solenoids are not energized returning the brakes to manual control. In flight and during the first phase of landing, relay R4 is actuated, supplying power to line 145 as already described in connection with Fig. 3, so that closure of any switch S3 then releases the brake on the corresponding wheel independently of the rotation of the other wheels.

A result of the described type of control is that the brake is immediately released on any wheel that stops throughout the landing operation and until the aircraft has substantially stopped. However, once all wheels have stopped, further action of that type is automatically disabled. Therefore, even if the pilot neglects to turn off the anti-skid system after substantial completion of a landing, that system is automatically disabled by substantial stopping of all wheels.

Skid-sensing unit

Figs. 5 through 11 show an illustrative sensing mechanism responsive to wheel rotation and acceleration and embodying certain aspects of the present invention. That device is particularly adapted for use as the sensing means 60, already referred to, and is so designated in Fig. 5.

Sensing mechanism 60, as shown, includes a generally cylindrical housing 200 which is adapted to be mounted coaxially of the wheel axis and near the outboard end of the fixed axle 22 on which the wheel is journaled, for example as indicated in Fig. 1. The housing comprises two main sections, a tubular portion 205 and an outer end portion 206, which are threaded together at 207 with suitable sealing means such as the O-ring 208. An electrical connector 210 is fixedly mounted coaxially at the inner end of the housing, with suitable sealing means shown as the O-ring 211. The connector thus forms the inner end wall of the housing. The outer end portion of the housing encloses a flywheel chamber 202 of enlarged diameter.

A shaft 220 is journaled coaxially of housing 200 on an outer bearing 222, which is carried by an inwardly extending flange portion 223 of housing end wall 206, and on an inner bearing 225, which is carried by a transverse wall 226, fixedly mounted near the inner end of the housing. The outer end of shaft 220 extends at 228 through a central aperture in housing end wall 206, and carries a fitting 229 by which it may be driven from the aircraft wheel by any suitable driving connection. As shown, fitting 229 is splined to shaft 220 and is driven via a damped yielding connection 180, to be described, by drive strap 62, which is typically fixedly mounted on the aircraft wheel. In the present embodiment, forward rotation of the aircraft wheel corresponds to clockwise rotation of shaft 220 as seen in Figs. 7 to 11, for example. The terms "clockwise" and "counterclockwise" as employed herein will refer to that aspect of the mechanism unless the contrary is expressly indicated.

Two distinct types of mechanism for sensing rotation are driven by shaft 220. One of those mechanisms is responsive primarily to shaft acceleration and will be referred to as the primary sensing mechanism. It typically controls switches S1 and S2 of Figs. 3 or 4. The other mechanism, which will be referred to as the secondary sensing mechanism, is responsive to shaft speed and preferably also to acceleration, and typically controls switch S3 of Figs. 3 or 4. As shown, both primary and secondary mechanisms are driven from a single driving arm 230, which is rigidly mounted on the shaft intermediate its length. Driving arm 230 comprises a generally triangular element lying in a transverse plane and shown broken away in Fig. 6C. A knurled flange 232 of shaft 220 is received in a slotted bore in arm 230, and is firmly gripped by clamping action of a screw 231. The primary sensing mechanism 260 is mounted outwardly of driving arm 230, as shown, for example, in Figs. 6A, 6B and 6C. It is driven by an elongated stud 234, which is fixedly mounted near the outer end of arm 230 and extends therefrom parallel to the shaft axis in an outward direction. The secondary sensing mechanism 328 is mounted inwardly of driving arm 230, as shown, for example, in Figs. 6D, 6E and 6F, and is driven by two pins 236 and 237. Those pins extend rigidly inwardly from driving arm 230 and are symmetrically placed with respect to shaft 220 in an axial plane.

Primary sensing mechanism 260 comprises a flywheel 240, which is journaled coaxially with shaft 220, preferably, although not necessarily by bearing means acting between the flywheel and shaft. Flywheel 240 is driven from driving stud 234 by yielding means that respond to the magnitude and direction of the driving torque. Since that torque is substantially the only torque acting on the flywheel, it is closely proportional to the rate of acceleration of the flywheel. Under normal conditions, that acceleration provides a useful measure of the rate of acceleration of the aircraft wheel. However, since the wheel is occasionally subject to high rates of acceleration, for example as it enters or recovers from a skid condition, it is desirable to provide means for limiting the torque that can be transmitted between the wheel and the sensing means, and between the shaft of the sensing means and the flywheel. That is useful not only to reduce mechanical loading of the parts but also to effectively eliminate oscillations and to maintain more nearly uniform flywheel speed. A novel type of torque-limiting system in accordance with the present invention comprises the damped yielding driving connection 180, which is illustratively shown as forming part of the connection between the wheel and shaft 220; and a torque-limiting over-running clutch 250 of novel design, which is preferably connected between sensing mechanism 260 and the flywheel.

Damped driving connection

Damped yielding connection 180 acts under all normal braking conditions as a positive connection between the wheel and shaft 220; but under conditions of abnormal wheel acceleration, as at touchdown or during recovery from a skid, it permits limited forward rotation of the wheel with respect to the shaft under damped resilient control. That yielding action is sufficient to accommodate rapid wheel acceleration to normal maximum speed, typically determined in practice by the maximum landing speed for the particular aircraft in question.

Yielding connection 180 typically comprises structure forming an annular chamber 182 containing a coil spring 183 acting between two defining formations 187 and 188, which are rotatively fixed with respect to driving strap 62 and shaft 220, respectively. Chamber 182 is filled with a suitable damping fluid, preferably having a relatively high coefficient of viscosity that is relatively independent of temperature. As shown illustratively, chamber 182 is of substantially square section, the radially outer wall and the two axial walls being formed as integral flange portions of fitting 229, which is keyed to shaft 220 and retained by the washer 185 and nut 186. A member 190 comprises inner and outer axially extending flanges 191 and 192 joined by a radial web portion 193. Inner flange 191 forms the radially inner wall of chamber 182. The outer periphery of outer flange 192 carries spline formations 194, which engage corresponding formations in a bore in driving strap 62, which may be axially defined by the snap rings 196. Member 190 partially surrounds fitting 229 in closely spaced relation, forming a seal of capillary type for retention of the damping fluid. Additional sealing means may be provided, if desired, such as the rings 197 and 198 set in grooves in the opposing faces of flanges 191 and 192 near their free ends. An annular equalizing channel may be provided by beveling an edge of member 229 as indicated at 199.

Spring defining formation 188 is fixedly mounted with respect to fitting 229 and forms a wall or abutment extending essentially completely across chamber 182 in an axial plane. Formation 187 is fixedly mounted with respect to member 190, to which it may be releasably secured by a screw 189 through inner flange 191. Formations 187 and 188 both form walls extending substantially completely across chamber 182 in respective axial planes. One or both of those walls is preferably provided with an orifice permitting limited fluid flow. Such an orifice may, for example, comprise a clearance of predetermined width surrounding formation 187, which then acts as a piston with limited by-pass. The ends of spring 183 engage respective faces of abutments 187 and 188, normally producing yielding engagement of their opposite faces and thereby defining a normal relative rotational position of shaft 220 and driving strap 62.

Spring 183 is preferably so preloaded that it exerts sufficient force in that normal fully extended positions to maintain contact of formations 187 and 188 unless the rate of acceleration of the wheel exceeds a relatively large critical value, such, for example, as several hundred radians per second per second. When that value is exceeded, the driving torque from the wheel causes deformation of coupling 180 against the force of spring 183, which force tends to increase progressively with such deformation. A relatively large driving torque is thereby transmitted to the flywheel, accelerating it to full operating speed with minimum delay. Yet the limited yielding action of the coupling prevents sudden wheel acceleration from subjecting the mechanism to excessive loads. The damping action, due to fluid in chamber 182 and to friction of the parts, is preferably arranged to produce somewhat less than critical damping with respect to the force constant of spring 183. Hence, after the wheel reaches rolling speed deflection of the coupling returns to zero smoothly and without undue disturbance of the mechanism to be described.

*Over-running clutch*

A preferred modification of torque-limiting over-running clutch 250 will now be described. A driving member 244 is journaled on shaft 220 by means of the single ball bearing 245. Member 244 has the general form of a rather thick disk, and will be referred to for clarity as a disk, but without thereby implying any limitation as to form. An elongated driving stud or pin 246 is fixedly mounted on disk 244, extending axially inwardly in eccentric relation to shaft 220 and parallel thereto. Pin 246 is drivingly linked with stud 234 of driving arm 230 by yielding means to be described. Whereas the latter means provide some resilience to that linkage, for present purposes it may be convenient to consider that pin 246 and driving disk 244 are driven directly with shaft 220.

A plurality of steel balls 248 are mounted in the periphery of disk 244 in guideways of any suitable type, shown as cylindrical channels 249, which lie in a common radial plane and form acute angles with the periphery of disk 244. The outer faces of balls 248 project beyond the periphery of the disk and engage a shallow channel 243 in the radially inner face of a ring 242. That ring is fixedly related to flywheel 240, and, in the present preferred embodiment, constitutes the sole support for the flywheel. Balls 248 thus provide in effect a journal bearing for the flywheel, ring 242 functioning as the outer race of a ball-bearing. A protective annular skirt 253 is carried by ring 242 and overlaps disk 244 in closely spaced relation. Flywheel 240 is shown axially offset outwardly from the plane of balls 248, so that it lies essentially in the plane of outer shaft bearing 222. That offset is useful in practice in adapting the outer configuration of the entire device to the space available in an actual aircraft. Alternatively, the body of the flywheel might lie essentially in the plane of overrunning clutch 250. It will be seen that additional bearing means for the flywheel can be provided, if desired, either supplementing the action of balls 248 or completely defining the flywheel axis. The present embodiment has the advantages of remarkable simplicity and economy of construction.

Each of the balls 248 is yieldingly urged along its guideway 249 by a coil spring 252 in a direction to engage ring 242. Springs 252 are designed to exert a predetermined force upon the balls, and hence also against ring 242. Forward (counterclockwise as seen in Fig. 8) relative rotation of disk 244 with respect to flywheel mounting ring 242 causes the balls to roll outward in their guideways 249, so that they become locked between the guideway wall and the smooth race 243. A positive driving connection in the forward direction is thereby provided between driving disk 244 and the flywheel. On the other hand, forward relative rotation of the flywheel with respect to driving disk 244, as may occur, for example, during abnormally rapid wheel deceleration, typically causes the balls to roll on ring 242 as on a bearing race, that rolling action producing sliding contact between each ball and its spring 252, and also between each ball and the side wall of its guideway. That sliding action produces an appreciable frictional resistance against forward relative rotation of the flywheel with respect to driving disk 244. The magnitude of that friction can conveniently be determined in advance by suitable selection of design factors, including in particular the force exerted by springs 252 and the acute angle of guideways 249. The device thus operates in the deceleration direction as a torque-limiting over-running clutch, enabling disk 242 to exert upon flywheel 240 a decelerating torque of limited magnitude that tends to cause the flywheel to decelerate with the disk, but smoothly permits the flywheel to over-run the disk whenever that limited torque is insufficient to maintain them together. The critical torque value at which over-running clutch 250 is arranged to slip in a decelerating direction is preferably sufficient to produce reliable operation of sensing mechanism 260, to be described. That critical torque produces deceleration of flywheel 240 at a critical rate that is appreciably greater than the rate corresponding to maximum deceleration of the vehicle.

Because of that preferred relation between the critical torque value of over-running clutch 250 and the torque required to operate sensing mechanism 260, it is often convenient, particularly when discussing operation of the latter, to consider driving disk 244 as an integral part of the flywheel. Under suitable circumstances, that view will be adopted in the present description and in the appended claims. Thus, the terms "inertial element" and "inertially driven element" are intended to embrace any element normally or primarily controlled by inertial action.

An important advantage of the illustrated type of over-running clutch is that it provides positive flywheel drive in the forward direction, and that the limited torque exerted on the flywheel in the rearward direction is uniform in magnitude, smooth in its action, and substantially independent of the relative speed of rotation of the clutch members. Moreover, the starting torque required to initiate relative rotation is only slightly greater than the continuing torque exerted during such rotation.

A particular feature of the illustrated over-running clutch is the arrangement of the springs 252 in bores 251 in disk 244 which are not parallel to their respective guideways 249, but are more nearly radial. As illustratively shown, the spring axis forms an angle of about 55° with the radius drawn to each ball, while the longitudinal axis of the ball guideway forms an angle of about 72° with that radius. That difference of angle is advantageous in providing more space for the coil springs without any increase in diameter of the mechanism and without reduction of the number of balls.

Guideways for the clutch balls may be formed in either the inner or the outer of the two relatively rotatable members, shown illustratively as flywheel 240 and disk 244, the balls being yieldingly urged in each instance into oblique contact with the other member. An advantage of the present embodiment is that for a unit of given overall diameter, the diameter of ball race 243 is a maximum, enabling the clutch to transmit a higher torque for a given surface friction at each ball.

*Skid-sensing mechanism*

A particularly effective primary sensing mechanism will now be described, comprising a yielding connection between shaft 220 and flywheel 240 and means responsive to the phase difference produced between those elements when changes of shaft speed cause yielding of the connection. Among the outstanding advantages of the present mechanism are the facts that it is capable of producing two distinct signals in response to two different predetermined conditions of shaft deceleration; that one of those signals is produced also in response to a predetermined degree of positive shaft acceleration; that electrical signals are produced without the use of any continuously operating electrical brushes; and that the degree of shaft deceleration to which the device responds may be made to depend in a useful manner upon the rate of shaft rotation and also upon the immediately preceding acceleration behavior of the shaft. In particular, the sensitivity of response of the device to shaft deceleration may be made to increase with shaft speed; and may be made to be greater during the first of a series of successive decelerations that are closely spaced in time, and to be less during successive decelerations of such a series.

The present illustrative sensing mechanism is designated generally by the numeral 260. It comprises arcuate electrical terminals coaxial with shaft 220 and fixedly mounted in insulated relation on housing 200, and contact means carried by the shaft and adapted to be shifted in response to shaft acceleration between a position spaced from the terminals and a position electrically contacting the terminals. In the present preferred embodiment each signal is developed by causing a single contact element to engage simultaneously two arcuate terminals.

Shaft 220 carries a lever 270, which is swingable in a radial plane about a pivot axis parallel to the shaft axis and offset therefrom. As shown, the pivot for lever 270 comprises stud 234, which is eccentrically carried by arm 230 as already described. Lever 270 typically has the general form of a flat plate lying in the plane of its movement. A bore near one end receives stud 234 and acts as a pivot bearing. An arcuate slot 271 coaxial with stud 234 provides clearance for shaft 220 as lever 270 swings through a limited angle with respect to driving arm 230. The ends of slot 271 may conveniently provide limit stops for that movement, engaging shaft 220 as indicated at 273 in Fig. 7D. An enlargement of clearance slot 271 at 272 may be provided to facilitate assembly.

Lever 270 is provided with a second slotted hole 274 which extends generally radially with respect to stud 234, and receives with a sliding fit the end of driving pin 246, which is fixedly mounted on flywheel driving member 244 as already described. Hence, rotation of member 244 with respect to shaft 220 and driving arm 230 can occur only if lever 270 swings about its pivot stud 234. Such swinging movement is clearly shown by Figs. 7A, 7B, 7C and 7D.

Member 244 is yieldingly urged toward a normal rotational position with respect to shaft 220 by resilient means to be described. That normal position corresponds to a normal position of lever 270 with respect to driving arm 230. That normal relation of the parts may be considered to define a normal phase relation between the shaft and flywheel 240, since the flywheel is normally constrained by over-running clutch 250 to maintain a fixed phase relation with respect to member 244, as has already been pointed out. In the present illustrative embodiment, that normal position of lever 270 is taken as that of Fig. 7A, with slot 274 and pin 246 lying in the plane of pivot stud 234 and shaft 220. As pin 246 swings about shaft 220 out of that plane clockwise or counterclockwise, lever 270 swings through a corresponding angle about pivot stud 234 in the opposite sense. In the present illustrative arrangement, lever deflection about its pivot in the same sense as shaft rotation, typically counterclockwise as seen in Fig. 7, represents positive shaft acceleration, and deflection in the sense opposite to shaft rotation represents negative shaft acceleration, that is, deceleration. That relationship may be reversed, if desired, for example by locating pivot stud 234 at a smaller radius from shaft 220 than driving pin 246, instead of at a larger radius as in the present embodiment. However, the described relationship permits certain novel advantages to be gained in the functioning of the apparatus, as will be explained.

Means are provided for generating signals in response to deflection of lever 270. Many types of electrical signaling mechanisms are known that respond to relative movement of two members. Whereas it is in many respects immaterial what type of such means is employed, it is preferred to utilize contacting means that act between lever 270 and the housing of the instrument. Since lever 270 is pivoted eccentrically with respect to shaft 220, its deflection causes a change in its position with respect to the cylindrical housing wall. An electrical contact can therefore be mounted on the lever in a common radial plane with a terminal ring mounted on the inner surface of the housing, the contact engaging the terminal ring in one position or range of positions of the lever and being spaced from that terminal ring in another position or range of positions.

As illustrated, a plurality of terminal rings is fixedly mounted on the housing by means of a cylindrical shell 262 of insulative material. Shell 262 is received within housing member 205, to which it is fixed in any suitable manner both axially and rotationally. For example, shell 262 may be axially defined by a snap ring 263 against which it is firmly held by a coaxial coil spring 261. Outer and inner circular terminal rings 265 and 266 and an intermediate common circular terminal ring 264 are partially embedded or otherwise fixedly mounted at the inner cylindrical surface of shell 262 in axially spaced relation. Those terminal rings are preferably all of the same diameter and their adjacent radially inner corners are beveled, as at 267. Individual electrical connections between the respective terminal rings and contact pins of connector 210 may be embedded in the body of shell 262, as indicated illustratively at 268.

First and second contact elements in the form of rollers 280 and 290, respectively, are mounted on lever 270 near its free end, which is on the opposite side of shaft 220 from lever pivot 234. First contact roller 280 is journaled in a radial plane intermediate the terminal rings 264 and 265 with its rim projecting beyond the edge of lever 270 by such an amount that it is closely spaced from the terminal rings in normal position of the lever (Fig. 7A). Lever deflection in either direction causes the roller to swing bodily about lever pivot 234, increasing its radius from shaft 220 until, at definite lever positions, the roller rim engages its terminal rings. Typical lever positions corresponding to such engagement for lever rotation clockwise and counterclockwise about pivot stud 234 are shown in Figs. 7B and 7D, respectively.

Second contact roller 290 is journaled on lever 270 in a radial plane intermediate terminal rings 264 and 266, in position to be spaced therefrom in normal position of the lever and to engage those rings only when the lever swings in a clockwise direction to some definite angle beyond that which produces contact by first roller 280. Such a lever position is illustratively shown in Fig. 7C.

Each contact roller preferably comprises, as shown best for roller 290, an electrically conductive rim or tire 292, a hub portion 293 of electrically insulative material, and a bushing 294 which acts as a journal bearing on the roller spindle 291. The roller rim is of suitable width to bridge between two adjacent terminal rings, first roller 280 typically bridging rings 264 and 265, and second roller 290 bridging rings 264 and 266. The edges of the roller rims are preferably beveled to correspond to the adjacent beveled edges 267 of the rings, and each roller is allowed slight axial play on its spindle, sufficient to permit it to center itself with respect to the two terminals, insuring uniform and effective contact of both of them. Axial movement of the roller for that purpose requires only negligible force in practice, due to rotation of the roller on its axis. Use of such a roller as a contacting member has the advantage over a conventional sliding contact that uniform and reliable contact with two terminal rings can be obtained by mechanism that is compact in form and that does not require unusually high accuracy. Additional important functional advantages will be described.

First roller 280 is yieldingly mounted on lever 270 so that roller contact with its terminal rings does not prevent further swinging of the lever. For example, the roller may be journaled on a spindle 281 which is fixedly mounted on a bracket 282, that bracket being pivoted in turn on lever 270 on an axis parallel to spindle 281 by means of the pivot stud 283. A spring 284 is arranged to yieldingly urge bracket 282 counterclockwise about its pivot 283 toward the position shown in Fig. 7A, for example, stop means of any suitable type being provided to define that position. A stop lug 288 is illustratively shown on bracket 282, engaging a stud 287 fixed on lever 270. When swinging of lever 270 causes roller 280 to engage its terminals, pressure of the latter on the roller rim may then swing bracket 282 against spring pressure in a direction to permit further lever movement.

The lever is thereby permitted to swing to the position of Fig. 7C, where second roller 290 also engages its terminals. The result is that clockwise lever movement from normal position, representing deceleration of shaft 220, produces a first electrical contact between terminals 264 and 265 by roller 280 at a first predetermined angle (Fig. 7B) and produces a second electrical contact between terminals 264 and 266 by roller 290 at a second predetermined angle (Fig. 7C). Similarly, deflection of lever 270 counterclockwise from normal position, representing positive shaft acceleration, produces electrical contact between terminals 264 and 265 by roller 280 at some predetermined angle, shown illustratively in Fig. 7D. Lever movement beyond the position of Fig. 7D is permitted by the yielding mounting of roller 280, but is limited by positive stop means of any suitable type, shown as contact of shaft 220 and the end 273 of clearance slot 271. Counterclockwise lever movement is thus stopped short of the angle at which second roller 290 would contact its terminals.

In the present embodiment, first roller 280 contacts its terminals at equal deflection angles in the two directions, since in normal lever position (Fig. 7A) the roller axis lies in an axial plane. The deflection angles at which the roller makes electrical contact for shaft acceleration and deceleration may be made different if desired, for example by mounting the roller to one side or the other of that axial plane.

In the present embodiment, second roller 290 is journaled directly on spindle 291, which is fixed in lever 270, so that the roller axis is fixed with relation to the lever. The second electrical contact therefore acts as a limit stop for the lever movement. Any further shaft deceleration beyond that represented by Fig. 7C then holds both rollers firmly in contact with their terminals. That action is typically aided by the centrifugal force developed by lever 270 in its rotation about shaft 220. The torque limiting action of over-running clutch 250 prevents the force on roller 290 from becoming excessive. Alternatively, roller 290 may be journaled on an axis that is yieldable with respect to the lever, for example in the manner described for roller 280, other stop means for the lever being then provided, such, for example, as contact of shaft 220 and the end of clearance slot 271.

Whereas the yielding mounting of first contact roller 280, as on the pivoted bracket 282, permits movement of lever 270 to continue beyond the angle of initial contact, such movement causes deflection of the roller axis against the restoring force of spring 284. Deflection of bracket spring 284 produces a reaction force tending to restore lever 270 toward normal position. That action is limited to lever angles at which roller 280 makes electrical contact, typically angles between Figs. 7B and 7C, and does not occur at positions intermediate those of Figs. 7B and 7D, where roller 280 is spaced from the housing wall. Whereas the restoring force in question may be controlled within wide limits by detailed design and by selection of the spring constant of spring 284, it is preferred to provide sufficient spring force to insure firm electrical contact between roller 280 and its terminals. The reaction torque on lever 270 is then typically an appreciable factor in determining its movement.

However, in accordance with the present invention, it may be preferred to maintain a substantially linear relation between lever deflection and magnitude of overall effective restoring force, in spite of the non-linear component of lever restoring force caused by displacement of roller 280. That may be accomplished by providing primary restoring means for lever 270 having non-linear action of a type to compensate part or all of the described effect of roller displacement. An important advantage of maintaining the overall net restoring force normally acting on lever 270 substantially independent of lever deflection is that the energy that must be taken from the flywheel to produce and maintain a second signal is thereby appreciably reduced, permitting corresponding reduction in moment of inertia of the flywheel. For during swinging movement of lever 270 toward second signal position, the flywheel must exert a torque upon the lever at least equal to the total restoring force plus any damping friction such as will be described; and the torque required to maintain the second signal must overcome the restoring force at maximum lever deflection. In practice, during production of the second signal, the wheel deceleration is typically rather high and causes slipping of over-running clutch 250, so that the energy taken from the flywheel depends upon the limiting torque at which that clutch is designed to slip. That limiting torque, in turn, depends primarily upon the torque required to deflect lever 270 against its effective restoring force and to maintain effective contact for the second signal. The limiting torque for clutch 250 may therefore be reduced considerably by providing a primary restoring force for lever 270 that is non-linear and that substantially compensates the restoring action of the first signal contact.

An illustrative form of such non-linear restoring means, designated generally by the numeral 300, comprises a cam member, a cam follower and resilient means such as a spring yielding urging mutual engagement of the cam and cam follower, the said members being mounted so that deflection of the flywheel from its normal phase relation to shaft 220 and the accompanying deflection of lever 270 from its normal position typically cause the cam follower to move over the cam surface and to compress the spring. The energy thus stored in the spring tends to return the yielding coupling to normal position, the effective magnitude of the restoring force so developed depending upon detailed design of the mechanism. By suitable selection of design factors, including in particular the form of the cam face, the effective restoring force can be made to vary in substantially any desired manner with the angle of lever deflection.

In the present preferred embodiment, two separate cam members 302 and 312 are provided, which control the restoring force during lever deflection in clockwise and in counterclockwise directions, respectively, from normal position. Cam members 302 and 312 are rotatably mounted on a common pivot axis fixed with respect to shaft 220 and driving arm 230. As shown, the cams are pivotally mounted on the outer end of pivot stud 234, already described, which is fixedly mounted on arm 230 and acts as pivotal mounting for lever 270. The cams are thus located axially between lever 270 and flywheel driving member 244. A coil spring 310 yieldingly urges rotary movement of the cams in opposite directions about their common pivot 234 toward respective normal positions which may be defined by positive stop means of any suitable type.

The cam members may conveniently comprise hub portions 303 and 313 which are spaced axially of stud 234 on opposite sides of spring 310; and arm portions 304 and 314 which extend generally radially from stud 234 on opposite sides of driving pin 246 in a common radial plane. Cam faces 306 and 316, formed on the opposing sides of the respective cam arms, engage the cylindrical surface 318 of pin 246, which is thus utilized as a common cam follower for both cams. Thus pin 246 serves not only as driving connection between lever 270 and flywheel driving member 244, but also as cam follower in the resilient restoring means. In the latter capacity, the cam follower portion 318 of pin 246 is to be considered as representative of any suitable cam follower structure that is linked to member 244. The end portions of the cam arms may curve toward each other so that their extreme ends 305 and 315 may abut opposite sides of shaft 220, which thereby provides convenient positive stop means to define the normal positions of the cams. It may be noted that shaft 220 can not rotate relative to the abutting cam ends, since cam pivot stud 234 is mounted on arm 230 and necessarily rotates with the shaft.

Although cam follower 318 is mounted on member 244 rather than on lever 270, it is constrained by slot 274 to move with the lever in respect to swinging movement of the latter about pivot stud 234. That component of the cam follower movement causes one or other of the cams to swing about stud 234 in opposition to the force of spring 310, which thereby exerts a force upon lever 270 tending to return it to normal position. But the movement of cam follower 318 also has a component that is radial with respect to pivot stud 234, due to the fact that flywheel driving member 244, on which it is mounted, is journaled on the axis of shaft 220 rather than on stud 234. That radial component of the cam follower movement causes the follower to move progressively along the cam face as the cam is deflected. That movement increases the lever arm at which the force of spring 310 is taken by the cam follower, thereby tending to reduce the restoring torque as lever 270 departs further from its normal position.

Moreover, of the force exerted between the cam and cam follower, only the component tangential with respect to the axis of shaft 220 is effective in producing a restoring torque tending to restore the mechanism to normal position. That component depends upon the angle between the cam face at the point of follower contact and a plane through that point and the shaft axis, the effective torque decreasing as that angle approaches 90°. Hence, the effective restoring torque can be made to increase or decrease with increasing lever deflection by appropriate curvature of cam faces 306 and 316. It will be understood that as the cam follower moves along the cam face, the orientation of the face at the point of contact depends not only on curvature of the face itself, but also on swinging movement of the cam element about its pivot 234. Hence, with the type of structure shown, even a plane cam face may produce an appreciably non-linear relation between lever deflection and restoring torque. The term "curvature" applied to the cam face is used, unless otherwise indicated, in the generic sense that includes zero curvature.

An advantage of employing separate cam members for control of lever deflection in the two directions from normal position is that spring 310 may be appreciably preloaded in normal position of the cams, so that, if desired, lever 270 remains in normal position until the rate of shaft acceleration reaches some appreciable predetermined value. In practice, it is preferred to provide such preloading of spring 310, and also to design the spring, as by providing several turns in the spring coil, so that the torque exerted upon the two cam members is substantially independent of their deflection. A further advantage of employing two separate cams is that different functional relations between the restoring torque and lever deflection may be provided for positive and negative shaft acceleration, as by providing cam surfaces 306 and 316 having suitable respective forms.

In the present preferred embodiment, however, the two cam faces 306 and 316 are identical. Each comprises essentially a first portion 307, which forms a relatively small acute angle with the plane through pivot stud 246, and a second portion 308, which forms (when engaged by the cam follower) a larger acute angle with such a plane (Fig. 7C). Hence, at the critical value of lever deflection at which the cam follower passes over the apex 309 between those two cam portions, the effective restoring torque exerted on lever 270 changes relatively abruptly between a relatively high value at lever deflections smaller than that critical value and a relatively low value at lever deflections larger than that critical value. That relatively abrupt shift in restoring torque is superposed upon the gradual decrease in torque with increasing lever deflection that results from bodily rotation of the cam member and from the changing lever arm, already mentioned. The described critical value of lever deflection is arranged to substantially coincide with the position represented in Fig. 7B, at which first roller 280 just contacts its terminal rings and at which roller bracket spring 284 just starts to be deflected. The decrease in restoring torque exerted on lever 270 that results from the described change in cam angle may be made to substantially compensate the increase in restoring torque that results from deflection of spring 284.

In the present embodiment it is not necessary to provide a similar change in value of the restoring torque produced by cam 312, which controls lever 270 during positive shaft acceleration, since lever 270 need not swing counterclockwise beyond the position of Fig. 7D, which corresponds to the "critical" position described above. However, it is convenient to make the cams 302 and 312 identical, so that the same cam assembly can be used in assembling a sencing unit without regard to the direction of forward shaft rotation.

A further advantage of the present type of mechanism for yieldably urging lever 270 toward normal position is that it can be made to develop appreciable friction. Such friction is useful in damping swinging movement of the lever, thereby reducing or eliminating any tendency of flywheel 240 to oscillate with respect to shaft 220 due to sudden changes of condition. The degree of effective damping can be determined by suitable design. In particular, sliding friction between the cam and cam follower tends to increase as the force of spring 310 increases and also as the angle between the cam face and the axial plane through shaft 220 and the point of contact approaches 90°. By coordinated selection of those two factors, the magnitudes of the damping friction and of the effective restoring force can be independently controlled.

*Regenerative action*

As already indicated, it is preferred that the linkage between sensing lever 270 and the two members whose relative rotation it senses, typically shaft arm 230 and flywheel 240 or its driving member 244, is such that shaft deceleration produces lever rotation about its pivot in the sense opposite to that of the shaft rotation relative to the housing. As shown in Figs. 7, for example, forward rotation of the wheel to be braked drives shaft 220 in a counterclockwise direction, indicated by the arrow 276 in Fig. 7C, whereas wheel deceleration tends to cause relative clockwise deflection of lever 270, indicated in Figs. 7B and 7C by the arrows 277. That relation has the advantageous result that the relative rotation of the housing with respect to the shaft, indicated by the arrow 278, is in the same direction as the lever deflection produced by an incipient skid condition (wheel deceleration). Hence any friction between the electrical contacting means on lever 270 and on the housing tends to increase rather than to decrease lever deflection. The sensitivity of the device is thereby increased, in contrast to the decrease in effective sensitivity that is usually associated with friction.

In particular, after first roller 280 has engaged its terminal rings and has come up to speed, rolling on the terminals in response to shaft rotation, any friction at the roller journal results in application of a clockwise torque to lever 270. That torque tends to compensate the counterclockwise torque, already discussed, which results from deflection of roller bracket spring 284. It is therefore not necessary to provide elaborate bearings for the contact rollers, since roller friction produces a useful rather than a harmful result. Moreover, if roller 280 is considered to represent a simple brush structure yieldably mounted on lever 270, the spring force required to deflect the brush during contact with its terminal rings and the sliding friction of the brush along the terminal may be seen to produce oppositely directed torques on the lever, thereby at least partially compensating each other.

A further important result of the described rotational relation concerns the force that must be applied to the contact rollers to accelerate them to speed. If lever 270 has been in normal position for any appreciable time, so that the contact rollers are stationary on their spindles, and is then deflected to the position of Figs. 7B, bringing roller 280 into engagement with its terminals, the relative peripheral speeds of the two surfaces at initial contact is typically quite high. Initial contact therefore involves sliding or skidding of the contact roller on the terminals, and produces very appreciable frictional forces. In accordance with the present aspect of the invention, the frictional force thus exerted on the roller is in a direction to increase rather than to decrease deflection of lever 270. The action thus may be said to render the device more sensitive with respect to contact of the second roller. That frictional force and the similar forces just described, as they affect sensitivity of the sensing mechanism, have a regenerative action similar in some respects to a positive feedback signal in a servo system, for example. In the present instance, the magnitude of the regenerative action due to inertial force is limited primarily by the force with which roller 280 is pressed against its terminals by spring 284, and by the coefficient of friction for that contact.

The effectiveness of that regenerative action increases with the change of speed of roller 280 that must be produced to bring the roller to a speed at which it rolls on its terminals without appreciable slipping. Hence, the effect tends to be greater the higher the wheel speed, and tends also to be greater the lower the roller speed at the time of contact. At the initial roller contact during any one landing operation, the roller is typically stationary with respect to its pivot, leading to a maximum effect. Hence the device is potentially most sensitive, with respect to development of its second signal, the first time it operates during each landing, and tends to become less sensitive for subsequent operations.

The detailed behavior of the effect just described can be controlled within wide limits by suitable design of the mechanism. For example, the magnitude of the effect is directly related to the moment of inertia of roller 280. To increase the effect, that roller can be increased in size or made of particularly heavy materials, for example, or one or more additional rollers may be provided, preferably mounted resiliently in a manner such as that already described for roller 280. A mechanism such as roller 280 may be employed solely for its regenerative effect, and need not perform any signal generating function. Such a roller may typically engage any convenient portion of the inner wall of the housing. The portion of the housing thus contacted may be formed of material having special properties if desired. For example, the roller may engage a ring of material which is mounted on the housing in the manner shown for terminals 264 and 265 and which has a particularly high coefficient of friction. Such a regenerative device may be arranged to engage the housing at a smaller lever deflection than first signal roller 280, thereby modifying the effective sensitivity of the device with respect to the first signal as well as with respect to the second signal. Moreover, such a regenerative device may be so positioned on lever 270 as to engage the housing wall only in response to wheel deceleration and not in response to positive wheel acceleration. That relation, which is illustrated, for example, in the case of second roller 290, prevents the roller from being accelerated to rolling speed during initial acceleration of the wheel at touchdown.

For a roller of given moment of inertia, the described regenerative effect tends to vary inversely with the roller diameter, and directly with the diameter of the surface it engages. The timing of the effect may be varied by suitable selection of the coefficient of friction between the roller and surface and of the force with which the roller is urged against the surface. For example, if spring 284 is relatively weak, the roller is brought up to rolling speed relatively slowly. The resulting increase in sensitivity of the mechanism at first operation is then relatively small, but extends over a longer period after initial roller contact is established. After the roller reaches rolling speed, the mechanism becomes less sensitive with respect to immediately subsequent operation; and that lower sensitivity persists for a longer time after any one operation of the mechanism the longer the roller continues to spin. Hence, the mechanism can be made to return to its initial more sensitive condition relatively rapidly, if desired, by providing a journal bearing for roller 280 of a type that produces relatively high friction. Such friction also directly increases the effective sensitivity of the mechanism at all times in the manner already described. Alternatively, additional friction means of suitable type may be provided, such, for example, as a spring washer 286 which is rotatively fixed to roller spindle 281 and bears frictionally against the axial face of the roller (Fig. 6C).

The mechanism can be so designed, with respect to the factors which control the described regenerative action, that the resulting friction at the rim of roller 280 at contact is sufficient to actually drive lever 270 in a clockwise direction, at least under conditions leading to maximum regenerative action. The lever may then move rapidly from the angle of first roller contact to the angle of second roller contact in response to regenerative action and even in the absence of any increase in the existing rate of wheel deceleration. That type of action, which involves a form of instability, may be made to occur, for example, only if roller 280 is substantially stationary on its pivot when it contacts its terminals, and if the rotational speed of the shaft is relatively high. Under such conditions, the regenerative action tends to produce contact of second roller 290 as a direct result of contact of first roller 280. The first signal then leads automatically to the second signal, and the brakes are accordingly not only arrested but released in effective response to the more sensitive first signal. However, at lower shaft speeds, or if roller 280 is already rotating rapidly at the moment of contact, as is typically the case shortly after recovery from an incipient skid, for example, the regenerative action is correspondingly less, and typically does not lead to instability of the type just described. Under such conditions, the first and second signals regain their normal identity and produce the distinctive actions already described. Hence, the distinctively different types of response can be provided by the same mechanism, depending upon such factors as wheel speed and the immediately preceding action of the brake system.

It is ordinarily preferred, however, to arrange the detailed structure of the mechanism so that the maximum possible regenerative action does not lead to instability. Under that condition, the nature of the control action may remain substantially uniform, while considerable control may still be exercised over the effective sensitivity with which the mechanism responds to wheel conditions.

*Phase relations of skid signals*

A preferred arrangement of the described sensing mechanism is such that the first signal is produced at a relatively small angular deflection of lever 270 from normal position and the second signal at a considerably greater deflection angle. Each value of that deflection angle corresponds to a definite phase difference between flywheel 240 and shaft 220, over-running clutch 250 being considered for the moment to provide a rigid coupling, as already indicated. In the present embodiment, the phase difference between flywheel and shaft is substantially equal to the angular deflection of lever 270 from equilibrium position, since driving pin 246 is approximately equidistant from shaft 220 and stud 234.

As an example, the first signal may occur at a phase angle of from a few degrees up to 5 or 10° and the second signal at a phase angle of about 20 to 30°. The second signal then not only follows the first signal after an appreciable interval (during which the wheel may recover); but requires for its production a distinctively different wheel condition. With the described arrangement, the primary condition for production of the first signal is that the wheel deceleration must reach a sufficient value to overcome the resilient restoring force of the sensing mechanism, determined in the present instance by such factors as the degree of preloading of spring 310 acting through cam 304. That value of deceleration may produce a first signal even though it is maintained only momentarily, since the required angular deflection of lever 270 is small. The second signal, on the other hand, occurs only if lever 270 is deflected through an appreciable angle. Such action requires a corresponding appreciable rotation of flywheel 240 relative to shaft 220. That relative rotation may be thought of as a phase difference between those two members. From that viewpoint, the primary condition for generation of the second signal is development of a definite critical phase angle between the flywheel and shaft. Such a critical phase difference of appreciable magnitude cannot be built up instantaneously, even by a high rate of shaft deceleration, but requires an appreciable time, during which the existing value of deceleration is first integrated with respect to time to produce an appreciable relative velocity between shaft and flywheel, and during which that velocity produces the required phase angle. That integrating action does not necessarily require that the magnitude of wheel deceleration become at any time higher than the value required to produce the first signal, that is, the value producing initial cam deflection. In fact, the cam mechanism may even be designed to permit lever deflection from first signal position to second signal position in response to a continuing rate of wheel deceleration lower than that required to produce the first signal. For example, the second cam face portion 308 may be so oriented that the net restoring force on lever 270 typically decreases after the first signal is made. Even with such arrangement, however, the second signal occurs only after the required critical phase angle between flywheel and shaft has been developed.

The critical phase angle for the second signal is preferably made greater than the phase angle that results, in absence of incipient skid conditions, due to flexibility of the landing gear and, more particularly, to action of the rubber-tired wheel in response to normal brake application. When that condition is met, normal brake application may produce a first signal, but cannot ordinarily produce a second signal. That has the great advantage that braking pressure is completely released only in response to an actual incipient skid of appreciable duration, and not accidentally in response to normal brake application.

It has been found that the rotational speed of a rubber-tired wheel of the type commonly employed on aircraft is typically reduced by normal brake application to a value that is approximately ten percent less than the free rolling speed. That speed reduction takes place at a relatively rapid rate, for example several hundred radians per second per second, which is comparable with rates of wheel deceleration that occur at the inception of a skid. That magnitude of the resulting phase difference between the flywheel and its shaft, in a skid-sensing device of the present type, depends upon the manner in which the flywheel is decelerated from the initial free-rolling wheel speed to the braked wheel speed. The torque available to produce that flywheel deceleration is determined essentially by the yielding driving connection between the flywheel and the shaft, or other wheel-driven element. In the present embodiment, that yielding driving connection comprises cam mechanism 300. That mechanism, through such design factors as the preloading of spring 310 and the angle of cam face 306, determines a definite critical value of the decelerating torque delivered to flywheel 240, and hence a definite value of flywheel deceleration, at which lever 270 starts to be deflected from normal position. Any value of wheel deceleration less than that critical value does not produce any phase difference between the flywheel and shaft, since the decelerating torque delivered to the flywheel is sufficient to decelerate it at the same rate as the shaft. However, if the wheel deceleration exceeds that critical value, the flywheel is decelerated more slowly than the shaft. That condition produces a difference in speed, and hence a difference of relative positions, of flywheel and shaft, the flywheel running ahead of the shaft by a phase difference that increases progressively until the flywheel speed again becomes equal to the shaft speed. The value of the resulting phase difference is given by the time integral of the difference in velocity of the flywheel and shaft during the period that they are unequal. That time integral tends to increase with increasing difference between rolling speed and normal braked speed of the particular wheel and tire in question; and tends to decrease with increasing stiffness of the yielding linkage between the flywheel and shaft.

Fig. 13 is a graph in which curve A represents the actual rotational speed of a pneumatic-tired wheel plotted schematically as a function of time, the vertical line E representing the time at which the brake is applied with a normal braking force, insufficient to produce a skid. Curve B represents the wheel speed that would correspond to the actual vehicle speed, that speed decreasing after time E in accordance with the rate of vehicle deceleration. The actual wheel speed is seen to decrease abruptly from that free-rolling speed to a normal braked wheel speed; the difference between rolling speed and braked speed being indicated at D. The indicated numerical values are merely illustrative. Curve C represents a typical flywheel speed, the flywheel being considered throughout the present discussion to turn with member 244. The flywheel speed equals the wheel speed A prior to brake application and for a short time thereafter. However, at a time indicated at F, the rate of deceleration of the wheel (and of shaft 220) exceeds the rate of flywheel deceleration that can be produced without yielding of coupling means 300. The flywheel speed continues to decrease at the latter rate from time F to time G, when the flywheel and wheel speeds again become equal. During that time interval, which will be referred to for convenience as the adjustment time interval, the phase angle between the flywheel and shaft increases from zero to a maximum value M, as indicated by the curve K. From Fig. 13 it is evident that the adjustment time interval FG is longer than the period of abnormal wheel deceleration due to the decrease of wheel speed from free-rolling speed B to braked speed A. The phase angle K corresponds to the deflection angle of lever 270, although it need not be linearly related to it. If the torque transmitted to the flywheel by resilient linkage 300 varies with the deflection angle of lever 270, the slope of curve C in Fig. 13 will vary correspondingly between times F and G, instead of being uniform as schematically shown. The phase angle represented by curve K is equal to the time integral of the difference of rotational speeds represented by curves A and C, indicated by the shaded area N in Fig. 13. The area P represents the corresponding time integral while the flywheel speed is less than the shaft speed and lever 270 is returning to its normal position.

Under the condition that the torque transmitted to the flywheel is substantially independent of its phase relation to shaft 220, and hence of the angular deflection of lever 270, within the operating range of the latter, an approximate expression for the maximum value of that time integral caused at normal brake application is the square of the difference between rolling speed and normal braked speed of the wheel divided by twice the critical value of wheel deceleration, described above, at which lever 270 is first deflected. When, as is preferred, the first signal is generated at a relatively small lever deflection, that critical value of wheel deceleration is substantially equal to the wheel deceleration represented by the first signal. Hence, in preferred form of the invention, the following relations are approximately true: The first signal occurs essentially at a definite critical value of wheel deceleration appreciably distinctly higher, for example by about ten to fifty percent, than the value corresponding to maximum normal vehicle deceleration; and the second signal occurs essentially at a definite critical value of the phase difference between flywheel and shaft which is distinctly greater than the square of the difference between rolling speed and normal braked speed of the wheel divided by twice the wheel deceleration corresponding to the first signal.

In accordance with another aspect of the invention already referred to, the first signal may be produced even more sensitively, for example at a wheel deceleration that corresponds to normal vehicle deceleration at some intermediate point of the run after the wheel loading has reached some predetermined fraction of its maximum value. The most advantageous value of that fraction depends upon such factors of the particular aircraft as size, landing speed, and wing type, but typically lies between one half and three quarters. For that manner of operation, it is preferred to arrange the resilient mechanism so that the restoring force increases appreciably with deflection of sensing lever 270. Then the second signal cannot result merely from continuation of the minimum rate of wheel deceleration capable of producing the first signal; but the continuing deceleration must also increase above that value sufficiently to overcome the effective restoring force as the sensing lever approaches the second signal position. That restoring force is at least sufficient that the wheel deceleration required to produce a second signal exceeds the maximum rate of vehicle deceleration under full wheel loading. However, the described phase angle considerations may still apply, and the second signal preferably cannot occur in response to a deceleration that is only momentary, whatever its magnitude.

In a preferred example of the present type, then, the restoring force to be overcome at first signal position of the sensing member corresponds to a rate of vehicle deceleration that normally occurs at a selected intermediate point of the run; while the restoring force for production of the second signal corresponds to a rate of vehicle deceleration greater than the maximum attainable by braking action even near the end of the run with maximum wheel loading; and the angular deflection of the sensing member for production of the second signal is sufficient, quite aside from the associated restoring force, that the momentary wheel deceleration at initial brake application cannot produce a second signal. Such an arrangement is particularly effective in combination with a control valve bypass permitting the braking pressure to increase at a suitable moderate rate during brake arresting condition of the control system, as already described. Then, during the latter part of the run, a first signal may be developed substantially continuously, holding the control system in brake arresting condition and permitting the brake pressure to increase at a rate that substantially corresponds to the progressive increase of wheel loading as the aircraft slows down. Any tendency to skid during that phase of operation is promptly controlled by production of a second signal, resulting in brake release. Following recovery from such a skid, the sensing member returns to neutral position, reapplying the brake. The brake pressure is then restored rapidly to an effective value, but is checked short of skidding by production of a first signal. The described arrangement is a particularly effective example of the great flexibility of which a system in accordance with the present invention is capable.

*Rotation-sensing mechanism*

The secondary sensing mechanism of the present illustrative device comprises particularly the parts shown in sections D, E and F of Fig. 6. That mechanism produces a signal in response to a combination of centrifugal forces derived from shaft rotation and other forces derived from shaft acceleration. Moreover, in preferred form the mechanism not only operates substantially without rest friction, but utilizes friction of the parts to increase the effective sensitivity. The combined action of the several forces is such that the mechanism responds directly by movement of mechanical parts to a remarkably low speed of shaft rotation when that speed is increasing. Under that condition the simple mechanical device to be described is capable of distinguishing between zero shaft speed and extremely low speeds that could previously be sensed only by more complex electrical or electronic equipment.

The resulting relative movement of mechanical parts of the mechanism may be employed in any convenient manner to generate a signal for control of the brake system. In the present embodiment an electrical signal is developed by operation of a switch. That switch corresponds to S3 of Figs. 3 and 4, for example, and is typically closed during shaft rotation and open when the shaft is stationary. Whereas the switch elements may be coupled with the moving parts of the mechanism in any convenient manner, the preferred type of coupling employed in the present embodiment involves an electrical contact member that moves outward in response to centrifugal force, so that the contact may engage and produce electrical contact between two arcuate terminals fixedly mounted coaxially of the main shaft. At all normal speeds of the aircraft wheel and shaft 220, centrifugal force maintains electrical connection between those terminals, thereby closing a signaling circuit. At zero shaft speed the contact member is retracted radially inward, as by force of a light spring, opening the circuit. An important advantage of the present aspect of the invention is that when the shaft again starts to rotate the switch is closed even before the centrifugal force is sufficient by itself to overcome the spring force. That is accomplished by substantially eliminating rest friction, and by providing mechanism which supplements the centrifugal force with forces derived from other sources, including in particular inertial and frictional forces.

It is convenient, particularly in order to maintain dynamic balance of the mechanism with respect to shaft rotation, to provide a plurality of similar mechanisms distributed angularly about the shaft. In the present illustrative embodiment two such mechanisms are employed, each carrying a distinct contacting member engageable with the same arcuate terminals. It will be seen that many advantages of the present aspect of the invention may be obtained with more than two such mechanisms, or with only a single one.

A yoke 330, comprising illustratively an elongated bar, has a central transverse bore which freely receives shaft 220 and is axially restrained thereon, as by the collars 331. The yoke is thus defined with respect to the shaft in all degrees of freedom except rotation. The spindles 332 and 332a are journaled on the respective ends of yoke 330 by means of anti-friction bearings 333 and 333a on axes parallel to and equidistant from shaft 220. Pinions 336 and 336a are fixedly mounted on the respective spindles and engage an internal ring gear 338 which is fixedly mounted with respect to the instrument housing in coaxial relation to shaft 220. As shown, ring gear 338 is embedded in the insulative sleeve 262 intermediate its length, the sleeve portions on opposite sides of the gear being bonded together through apertures 339 in the body of the gear. The spindles are thus driven by their respective pinions in direct accordance with rotation of yoke 330 about the shaft axis.

Two centrifugal masses 340 and 340a are mounted on the respective spindles 332 and 332a in rotatable relation thereto. Any desired type of anti-friction bearings may be employed for that mounting, but it is preferred to employ a simple type of bearing that will develop an appreciable but limited amount of friction. As shown, the ends of the spindle are simply received freely in bores in the masses. The masses are approximately semi-cylindrical in shape, with a diameter less than the internal diameter of the housing. They are mounted with their diametral faces 347 mutually opposed and adjacent the axial plane through yoke 330. In the present embodiment, the spindle axis for each mass is located near that end of its diametral face which lags angularly behind the center of inertia of the mass when the mechanism rotates in the forward direction of shaft 220, which is counterclockwise as seen in Figs. 10 and 11, for example. The opposing diametral faces 347 are recessed at 345 and 346 adjacent the two pivot axes, the opposed pairs of recesses forming two partially enclosed chambers which accommodate the respective pinions 336 and 336a. Each of the masses 340 and 340a is conveniently formed of axially outer and inner members 341 and 342. Those members of each pair may be slipped onto the respective opposite ends of their supporting spindle and rigidly secured together, as by the screw 343, to form an effectively unitary mass 340.

The masses are swingable about their respective spindles between retracted and extended positions. They are yieldingly urged toward retracted position (Figs. 10 and 11), as by the coil springs 348 and 348a, which surround the respective spindles and have one end anchored with respect to the mass and the other to the yoke. Retracted position of the masses is defined by any suitable stop means, for example by contact of the diametral face 347 of each mass with shaft 220.

An electrical contacting means is associated with at least one of the masses, and preferably with each of them. As shown, the masses carry respective contacting rollers 350 and 350a journaled on axes parallel to shaft 220. The rollers are positioned in a common radial plane in recesses 351 in portions 342 on the respective masses, with the roller peripheries projecting slightly beyond the cylindrical faces of the masses at a considerable distance from their respective pivot axes. Arcuate terminal formations 354 and 355 are fixedly mounted on the inner wall of the instrument case coaxially of shaft 220 in axially spaced and mutually insulated relation in such position that the roller peripheries are spaced from them in retracted position of the mechanism and engage both terminals in response to outward swinging of the masses. That roller contact typically defines the extended position of the masses. The roller and terminal structure may be similar to that already described in connection with contact roller 290. The roller axes are preferably yieldably related to the masses on which they are mounted, in order to limit the forces exerted at initial roller contact and to insure smooth continuance of that contact once it is made. For example, each roller may be journaled on a roller spindle 352 intermediate its length and the spindle ends may be received in the respective mass members 341 and 342 in bores 357 and 358 that are slotted in a direction that is approximately radial with respect to shaft 220. Each spindle is yieldingly urged outwardly toward the housing wall, as by a light spring 359 having one end engaging the side of the spindle toward shaft 220 and the other end fixedly mounted on mass member 342 (Fig. 10).

The described assembly of yoke and masses is driven from shaft 220, typically at substantially the same speed as the shaft. During such rotation, centrifugal force tends to swing the masses clockwise about their respective pivots into extended position, producing an electrical signal by roller contact with terminal rings 354 and 355. An important advantage of the present mechanism is the fact that the spindles on which the centrifugal masses are pivoted are themselves rotatively driven. That spindle rotation substantially or wholly eliminates rest friction at the mass pivots, so that the masses are free to shift between extended and retracted positions in response to relatively slight changes of shaft speed. Moreover, those shifts of mass position occur more accurately and reproducibly than when static pivots are employed. The direction of spindle rotation is preferably, although not necessarily, so selected that the dynamic friction between the masses and their rotating spindles tends to aid, rather than to oppose, centrifugal force. The masses are thereby caused to swing to extended position against the restoring force of springs 348 at a lower shaft velocity than would otherwise be the case.

The described assembly of yoke and masses may be rotatively driven from shaft 220 in any suitable manner. However, the coupling linkage is preferably of a type which applies the driving force in such a way that the driving force itself tends to swing the masses toward extended position. That may be accomplished, for example, by applying the driving force from shaft 220 directly to the masses rather than to the yoke, the point of application of the driving force being such that the driving force associated with forward rotation of shaft 220 exerts upon the masses respective torques tending to swing them radially outward toward extended position. As shown, that type of coupling is provided by engagement of the driving studs 236 and 237, which are fixed in driving arm 230 as already described, in radially elongated slot formations 362 in the respective masses 340 and 340a, as shown, for example, in Fig. 11. Slot formations 362 preferably fit their studs without appreciable backlash in a direction tangential with respect to shaft 220, thereby forming a linkage between the two masses which constrains the latter to swing together about their respective pivots. The effects of translational acceleration and of gravity, for example, upon the respective masses are thereby made to compensate each other. In a radial direction, studs 236 and 237 typically require only a little play in their slot formations to accommodate the relatively slight angle through which the masses swing about their spindles between retracted and extended positions.

Slot formations 362, as shown, are substantially in the axial plane through shaft 220 and spindles 332 and 332a; and each slot is intermediate the shaft and the spindle that carries its mass. Counterclockwise rotation of shaft 220 and the driving studs thus exerts upon each of the masses a clockwise torque with respect to its spindle. That torque tends to swing the masses toward their extended position. That effect increases with the driving force, and is therefore increased by any influence which tends to make the mass assembly lag behind the shaft. One such influence is friction at the bearings between spindles 332 and the masses 340 and also between the spindles and yoke 330.

Another influence affecting the driving force is the inertia of the parts whenever the speed of shaft 220 is increasing or decreasing. Under the condition of positive shaft acceleration, the force exerted by driving studs 236 and 237 not only must overcome the moment of inertia of the masses and yoke about the main shaft axis, which is relatively large because of the appreciable mass involved, but also must overcome the moments of inertia of pinions 336 about the respective spindle axes. Although the latter moments of inertia may be relatively small, their effect is increased by the relatively high rate of rotation of the pinions. All those inertial forces cause the driving studs to urge the masses strongly toward extended position in response to positive shaft acceleration. The result of that action is that the centrifugal mechanism is rendered additionally sensitive to shaft rotation whenever the speed of that rotation is increasing. The signal that indicates shaft rotation, comprising in the present embodiment closure of switch S3 in Fig. 3 or Fig. 4, is therefore produced by the present mechanism under conditions of shaft rotation that depend upon shaft acceleration as well as upon shaft speed. Under conditions of positive shaft acceleration, the critical value of shaft speed above which that signal is produced is relatively lower; and under conditions of shaft deceleration the critical value is correspondingly relatively higher than would be the case in absence of the described effect. The present invention makes effective use of the relatively low critical speed during positive shaft acceleration, particularly to insure availability of brakes promptly and independently of normal release of relay R4 under control of flight switch 31, if the aircraft starts to roll after being brought momentarily to full stop. The corrollary effect of a relatively high critical shaft speed for operation of switch S3 to open condition during wheel deceleration is not a significant disadvantage, particularly in the present type of system, since brake control is then handled satisfactorily by the primary sensing mechanism via switches S1 and S2.

Fig. 12 corresponds generally to Fig. 11, but represents a modification in which the centrifugal masses 340b and 340c are pivoted by means of the respective spindles 332b and 332c at the opposite ends of the diametral faces of the masses from the arrangement shown in Fig. 11. The pivot axes of the masses thus angularly lead their respective centers of inertia during forward (counterclockwise) rotation of shaft 220. Outward swinging of the masses from retracted to extended positions therefore involves rotary movement about their pivot axes in the same sense as the shaft rotation. Under that condition, driving studs 236 and 367 preferably engage driving formations 362c which are located on the respective masses 340c and 340b on opposite sides of shaft 220 from the pivot axes. The forward driving thrust then tends to swing the masses outward, as has already been described for the specific illustrative arrangement of Fig. 11.

In the modification of Fig. 12, as so far described, the mass spindles may be driven in the manner shown in Fig. 11. Dynamic friction between the spindles and their respective centrifugal masses then tends to swing the masses radially inward, rather than outward as in the previously described embodiment. That permits a corresponding reduction in the springs that yieldingly urge the masses inward. Hence, operation may be made substantially independent of the direction of spindle rotation under most conditions of operation. However, when the shaft accelerates slowly from zero speed, as when the aircraft starts to creep after being brought to a full stop, for example, it is advantageous to produce outward swinging of the masses at the earliest possible time. It is therefore preferred to drive each spindle in such direction that any friction between the spindle and its mass tends to swing the latter toward extended position. That may be accomplished, for example, by providing a suitable gear train between each spindle and stationary ring gear 338. Fig. 12 shows an illustrative gear train for spindle 332c, comprising the pinion 336c, fixed on the spindle, and the idler gear 337, which is journaled on a transverse extension of yoke 330a and engages both ring gear 338 and pinion 336c. A spring-mounted brush-type contact element 350b is indicated on mass 340b for engaging and electrically connecting the terminal rings 354 and 355 in extended position of the masses.

I claim:

1. In a control system for a vehicle wheel brake, which system comprises a rotatable inertially driven element, a driving element normally driven in a forward direction in accordance with the wheel rotation, a yielding connection between the driving element and the inertially driven element, and control means for relieving the brake in response to yielding of said connection; the improvement wherein said yielding connection comprises in combination a cam member having a cam face and movably mounted on one of said elements for rotation therewith, stop means for the cam member defining a normal position thereof with respect to said one element, resilient means yieldingly urging movement of the cam member toward the stop, and a cam follower mounted on the other element for rotation therewith and adapted to engage the cam face and thereby to define a normal relative rotational position of the elements when the cam member is in said normal position, the point of follower engagement being movable along the cam face in response to forward relative rotation of the inertial element, and wherein said control means comprises means acting to arrest brake action in response to a first mutual position of the elements that is spaced from said normal position, and means acting to release the brake in response to a second mutual position of the elements that is spaced beyond the first, said cam face comprising a first relatively steep face portion which is engaged by the follower at relative positions of the elements between said normal and first positions, and a second relatively flat face portion which is engaged by the follower at relative positions of the elements between said first and second positions.

2. In a control system for a vehicle wheel brake, which system comprises an inertially driven element rotatable about an axis, a coaxially rotatable driving element, normally driven in a forward direction in accordance with the wheel rotation, a yielding connection between the driving element and the inertially driven element, and control means for relieving the brake in response to yielding of said connection; the improvement wherein said yielding connection comprises in combination a pivot stud eccentrically mounted on one of the elements and extending axially therefrom toward said other element, a control member pivotally mounted on the pivot stud and swingable in a radial plane, a driving stud eccentrically mounted on the other element and extending axially therefrom toward said one element, the pivot stud and driving stud being spaced at different radii from the element axis, the driving stud engaging the control member and thereby driving the control member about the pivot stud upon yielding of said connection, and resilient means acting between the pivot stud and the driving stud and tending to maintain them in a normal angular relation with respect to the element axis, said control means being responsive to swinging movement of the control member about the pivot stud.

3. In a control system for a vehicle wheel brake, which system comprises an inertially driven element rotatable about an axis, a coaxially rotatable driving element, normally driven in a forward direction in accordance with the wheel rotation, a yielding connection between the driving element and the inertially driven element, and control means for relieving the brake in response to yielding of said connection; the improvement wherein said yielding connection comprises in combination a pivot stud eccentrically mounted on one of the elements and extending axially therefrom toward said other element, a control member pivotally mounted on the pivot stud and swingable in a radial plane, a driving stud eccentrically mounted on the other element and extending axially therefrom toward said one element, the pivot stud and driving stud being spaced at different radii from the element axis, the driving stud engaging the control member and thereby driving the control member about the pivot stud upon yielding of said connection, two cam members having cam faces and pivotally mounted on the pivot stud, resilient means yieldably urging swinging movement of the cam members about the pivot stud in opposite directions to bring their cam faces into opposed engagement with the driving stud, and stop formations defining normal positions of the cam members such that the driving stud lies substantially in the plane of the element axis and the pivot stud, movement of the driving stud out of that plane causing swinging movement of one of the cam members about the pivot stud against the yielding force of the resilient means, said control means being responsive to swinging movement of the control member about the pivot stud.

4. In a control system for a vehicle wheel brake, which system comprises an inertially driven element rotatable about an axis, a coaxially rotatable driving element normally driven in a forward direction in accordance with the wheel rotation, a yielding connection between the driving element and the inertially driven element, and brake control means for relieving the brake in response to yielding of said connection in a direction to permit forward rotation of the inertially driven element relative to the driving element; the improvement which comprises the combination of a control member movably mounted on one of the elements, coupling means between the other element and the control member acting to cause movement of the latter in an operating path in response to forward rotational movement of the inertial element relative to the driving element, arcuate terminal means fixedly mounted in coaxial relation to the element axis, an electrical contact member mounted on the control member for movement therewith, into engagement with the terminal means in response to movement of the control member in said operating path, the path of movement of the contact member relative to said one element and the path of relative movement of the engaged point of the terminal means relative to said one element forming an acute angle, whereby the frictional force exerted by the fixed terminal means on the engaged contact member has a component parallel to said movement of the electrical contact member and in a direction to urge further movement of the control member in said operating direction and thereby to maintain effective electrical contact between the contact member and the terminal means, said brake control means acting to relieve the brake in response to electrical contact of the contact member and the terminal means.

5. In a control system for a vehicle wheel brake, which system comprises an inertially driven element rotatable about an axis, a coaxially rotatable driving element normally driven in a forward direction in accordance with the wheel rotation, a yielding connection between the driving element and the inertially driven element, and brake control means for relieving the brake in response to yielding of said connection in a direction to permit forward rotation of the inertially driven element relative to the driving element; the improvement which comprises the combination of a control member pivotally mounted on one of said elements on a pivot axis parallel to the element axis and spaced therefrom, coupling means between the other element and the control member acting to define a normal position thereof and to cause swinging movement of the control member about its pivot axis from said normal position in response to forward rotational movement of the inertially driven element relative to the driving element, arcuate terminal means fixedly mounted in coaxial relation to the element axis, a contact roller having an electrically conductive peripheral portion and journaled on the control member on a roller axis spaced from the pivot axis in such position that the roller periphery is spaced from the terminal means in normal position of the control element and is caused to engage the terminal means in response to said swinging movement of the control member, the path of movement of the roller axis relative to said one element and the path of relative movement of the engaged point of the terminal means relative to said one element forming an acute angle, whereby the frictional force exerted by the terminal means on the engaged roller periphery has a component parallel to said swinging movement of the control member and tends to maintain effective electrical contact between the roller periphery and the terminal means, said brake control means acting to relieve the brake in response to electrical contact of the roller periphery and the terminal means.

6. In a control system for a vehicle wheel brake, which system comprises an inertially driven element rotatable about an axis, a coaxially rotatable driving element normally driven in a forward direction in accordance with the wheel rotation, a yielding connection between the driving element and the inertially driven element, and brake control means for relieving the brake in response to yielding of said connection in a direction to permit forward rotation of the inertially driven element relative to the driving element; the improvement which comprises the combination of a control member pivotally mounted on one of said elements on a pivot axis parallel to the element axis and spaced therefrom, coupling means between the other element and the control member acting to cause swinging of the control member about its pivot axis in response to forward rotational movement of the inertially driven element relative to the driving element, arcuate terminal means fixedly mounted in coaxial relation to the element axis, first and second electrical contact members mounted on the control member displaced from each other in the direction of swinging movement so as to engage the terminal means successively in response to said swinging movement of the control member, the path of movement of the first contact member relative to said one element and the path of relative movement of the terminal means relative to said one element forming an acute angle at the point of engagement by the first contact member, whereby the frictional force exerted by the fixed terminal means on the first engaged contact member has a component parallel to said swinging movement of the control member about its pivot axis and tends to cause engagement of the second contact member, said brake control means comprising means acting to arrest brake action in response to engagement of said first contact member, and means acting to release the brake in response to engagement of the second contact member.

7. The combination defined in claim 6, and in which said first engaged contact member comprises a contact roller having an electrically conductive peripheral portion and journaled on the control member on an axis spaced from the pivot axis.

8. In a control system for a vehicle wheel brake, which system comprises a vehicle frame portion, an element journaled on an element axis with respect to the frame portion and normally driven in response to wheel rotation, sensing means responsive to variations in rotational speed of said element, and brake control means acting to modify brake actuation under control of the sensing means; the improvement which comprises two electrical terminal rings mounted on the frame portion coaxially of the element in axially spaced relation, the opposed inner edges of said rings being obliquely beveled, a control member mounted on the element for radial swinging movement with respect thereto, a contact roller having an electrically conductive peripheral portion and journaled on the control member on a roller axis parallel to the element axis, the roller periphery being spaced from the terminal rings in one position of the control member and engaging the terminal rings in another position of the control member, the outer edges of the roller periphery being obliquely beveled and being adapted to engage the beveled edges of the respective terminal rings, said sensing means acting to shift the control member between its said positions in response to variations in wheel rotation, and said brake control means acting to modify brake actuation in response to electrical contact of the roller periphery and the terminal rings.

9. In a control system for a vehicle wheel brake, which system comprises a rotatable inertially driven element, a driving element normally driven in a forward direction in accordance with the wheel rotation, a driving connection between the driving element and the inertially driven element acting to maintain fixed relative rotational position of said elements during normal wheel rotation and comprising first yielding means acting to permit limited forward and rearward rotation of the inertially driven element relative to the driving element in response to abnormally rapid wheel deceleration and acceleration, respectively, and brake control means for relieving the brake in response to forward deflection of said first yielding means; the improvement which comprises the combination of second yielding means connected in series with said first yielding means between said elements and acting to permit limited rearward rotation of the inertial element with respect to the driving element only in response to rates of wheel acceleration greater than a predetermined value which is sufficient to produce the maximum rearward deflection of said first yielding means, and damping means connected in parallel to said second yielding means and responsive to deflection thereof, said damping means acting to substantially prevent oscillations initiated by deflection of the second yielding means.

10. In a control system for a vehicle wheel brake, which system comprises a rotatable inertial element, and a driving element normally driven in a forward direction in accordance with the wheel rotation, a driving connection between the driving element and the inertial element acting to maintain fixed relative rotational position of said elements during normal wheel rotation and comprising first yielding means acting to permit limited forward and rearward rotation of the inertial element relative to the driving element in response to abnormally rapid wheel deceleration and acceleration, respectively, and brake control means for relieving the brake in response to forward deflection of said first yielding means; the improvement which comprises the combination of over-running clutch means acting between the first yielding means and the inertial element, said over-running clutch means providing positive forward drive for the inertial element and permitting the inertial element to over-run the yielding means only in response to rates of wheel deceleration greater than a predetermined value which is sufficient to produce the maximum forward deflection of the first yielding means, and second yielding means acting to permit rearward rotational deflection of the inertial element with respect to the driving element through a limited angle and only in response to a driving torque greater than a predetermined value, said value of the driving torque being sufficient to accelerate the inertial element from zero speed to normal operating speed before the rearward rotational deflection exceeds the said limited angle.

11. In a control system for a vehicle wheel brake, which system comprises a rotatable inertial element, and a driving element normally driven in a forward direction in accordance with the wheel rotation; a driving connection between the driving element and the inertial element acting to maintain fixed relative rotational position of said elements during normal wheel rotation and comprising first yielding means acting to permit limited forward and rearward rotation of the inertial element relative to the driving element in response to abnormally rapid wheel deceleration and acceleration, respectively, and brake control means for relieving the brake in response to forward deflection of said first yielding means; the improvement which comprises the combination of over-running clutch means acting between the first yielding means and the inertial element, said over-running clutch means providing positive forward drive for the inertial element and permitting the inertial element to over-run the yielding means only in response to rates of wheel deceleration greater than a predetermined value which is sufficient to produce the maximum forward deflection of the first yielding means, and second yielding means acting to permit limited rearward rotation of the inertial element with respect to the driving element only in response to rates of wheel acceleration greater than a predetermined value which is sufficient to produce the maximum rearward deflection of said first yielding means, said second yielding means including damping means acting to substantially prevent oscillations initiated by deflection of the second yielding means.

12. In a control system for a vehicle wheel brake, which system comprises sensing means responsive to wheel rotation and comprising a frame member rotatable about an axis, a coaxially rotatable driving member, a plurality of centrifugal inertial members pivotally mounted on the frame member on respective circumferentially spaced pivot axes and swingable centrifugally about their pivot axes to respective outward positions in response to frame rotation, resilient means urging swinging movement of the inertial members to respective inward positions, means normally driving the driving member in a forward direction in accordance with the wheel rotation, and brake control means acting to relieve the brake in response to inward position of the inertial members; improved driving means for the frame member comprising driving formations mounted on the driving member and directly engaging the respective inertial members at respective points that are offset from said pivot axes, forward rotation of the driving member causing the driving formations to exert on the respective inertial members forces that oppose said resilient means and tend to swing the inertial members about their pivot axes to their respective outward positions, said forces acting through the pivot mountings of the inertial members to drive the frame member, whereby the inertial members swing outward during wheel acceleration at a lower wheel speed than they swing inward during wheel deceleration.

13. The improvement defined in claim 12, and including also inertial means acting to resist acceleration of the frame member and thereby to increase the magnitude of said forces during wheel acceleration, said inertial means comprising a rotary inertial element journaled on the frame and means for driving said rotary inertial element in response to frame rotation.

14. In a control system for a vehicle wheel brake, which system comprises an inertially driven element rotatable about an axis, a coaxially rotatable driving element normally driven in a forward direction in accordance with the wheel rotation, a yielding connection between the driving element and the inertially driven element, and brake control means for relieving the brake in response to yielding of said connection in a direction to permit forward rotation of the inertially driven element relative to the driving element; the improvement which comprises over-running clutch means connected in series with said yielding connection between said elements and comprising first and second coaxially rotatable members, means on one member forming a coaxial surface of revolution, a plurality of balls, means on the other member forming guideways for the respective balls circumferentially spaced in a common radial plane, the axes of the guideways intersecting the surface of revolution at equal acute angles, spring means urging the respective balls along their guideways into yielding engagement with the surface of revolution, each said spring means comprising a bore in said other member and a coil spring in the bore, the bore axis being substantially radial with respect to the ball and forming an oblique angle with the axis of the guideway.

15. In a control system for a vehicle wheel brake, which system includes an inertial element rotatable about an axis, a coaxially rotatable driving element normally driven in a forward direction in accordance with the wheel rotation, a yielding connection between the driving element and the inertial element, and brake control means for relieving the brake in response to yielding of said connection in a direction to permit forward rotation of the inertial element relative to the driving element; the improvement which comprises over-running clutch means connected between said yielding connection and said inertial element and comprising first and second coaxially rotatable members, a plurality of balls, means on one member forming a coaxial groove adapted to act as a race for the balls, means on the other member forming guideways for the respective balls circumferentially spaced in a common radial plane and intersecting the groove surface at equal oblique angles, spring means urging the respective balls along their guideways into yielding engagement with the groove surface, one of the said members being fixedly related to the inertial element and the other being journaled for rotation about the said axis, the said over-running clutch means forming the entire means for supporting the inertial element.

16. In a control system for a vehicle wheel brake, which system includes an inertial element rotatable about an axis, a coaxially rotatable driving element normally driven in a forward direction in accordance with the wheel rotation, a yielding connection between the driving element and the inertial element, and brake control means for relieving the brake in response to yielding of said connection in a direction to permit forward rotation of the inertial element relative to the driving element; the improvement which comprises journal means for the inertial element comprising first and second coaxially rotatable members, a plurality of balls, means on one member forming a coaxial groove adapted to act as a race for the balls, means on the other member forming guideways for the respective balls circumferentially spaced in a common radial plane and intersecting the groove surface at equal oblique angles, spring means urging the respective balls along their guideways into yielding engagement with the groove surface, one of the said members being fixedly related to the inertial element and the other being journaled for rotation about the said axis, and rotatively connected to said yielding connection, said journal means forming the entire support for the inertial element and acting as an over-running clutch between said inertial element and said yielding connection.

17. A control system for a vehicle wheel brake that is actuable in response to fluid pressure, said system comprising the combination of pressure conduit means normally communicating with the brake, means normally actuable to supply fluid pressure to said conduit means to actuate the brake, disabling valve means in series with said pressure conduit means and actuable to prevent fluid flow toward the brake, relief conduit means, normally closed relief valve means connected between the relief conduit means and the brake and actuable to provide a restricted fluid connection for limited fluid flow from the brake to the relief conduit means, first sensing means responsive to a first predetermined degree of wheel deceleration, second sensing means responsive to a second predetermined degree of wheel deceleration greater than the first, means for actuating said disabling valve means and said relief valve means under control of the first sensing means, and means for releasing the brake under control of the second sensing means.

18. A control system for a vehicle wheel brake that is actuable in response to fluid pressure, said system comprising the combination of pressure conduit means, relief conduit means, valve means connected between the pressure conduit means, the brake and the relief conduit means, said valve means having a normal position in which it provides a fluid connection for substantially free fluid flow between the brake and the pressure conduit means, said valve means being shiftable to a brake releasing position in which it provides a fluid connection for substantially free fluid flow between the brake and the relief conduit means, and said valve means being shiftable to a brake arresting position in which free fluid flow is prevented between the brake and both conduit means, first sensing means responsive to a first predetermined degree of wheel deceleration, second sensing means responsive to a second predetermined degree of wheel deceleration greater than the first, first coupling means for shifting the valve means to its brake arresting position under control of the first sensing means, and second coupling means for shifting the valve means to its brake releasing position under control of the second sensing means, said valve means including structure forming a bleeding passageway which provides a fluid connection for limited fluid flow between the brake and one of said conduit means only in said brake arresting position of the valve means.

19. A control system for an aircraft wheel brake that is actuable in response to fluid pressure, the aircraft brakes being capable of producing a predetermined maximum rate of normal vehicle deceleration when the aircraft wheels are fully loaded, said system comprising the combination of pressure conduit means normally communicating with the brake, means normally actuable to supply fluid pressure to said conduit means to actuate the brake, valve means in series with said pressure conduit means and actuable to restrict fluid flow therein to a predetermined restricted rate, first sensing means responsive to a first rate of wheel deceleration which corresponds to a rate of vehicle deceleration less than said maximum rate, second sensing means responsive to a second rate of wheel deceleration which corresponds to a rate of vehicle deceleration greater than said maximum rate, means for actuating said valve means under control of the first sensing means, and means for releasing the brake under control of the second sensing means.

20. A control system for an aircraft wheel brake as defined in claim 19 and in which the said restricted rate of fluid flow increases the brake pressure by from about 2% to about 8% of its value per second.

21. In a control system for a vehicle wheel brake, which system comprises a frame member rotatable about an axis and normally driven in accordance with rotation of the wheel, a centrifugal inertial member pivotally mounted on the frame eccentrically of the axis for outward swinging movement in response to frame rotation, yielding means urging inward swinging of the inertial member, and brake control means actuable to control the brake in response to swinging movement of the inertial member; the improvement which comprises a pivot spindle which is journaled eccentrically upon the frame member and upon which the inertial member is pivoted, and means for driving the spindle in response to frame rotation.

22. The improvement defined in claim 21, and in which the direction of drive of the pivot spindle in response to forward rotation of the vehicle wheel corresponds to outward swinging movement of the centrifugal inertial member.

23. The improvement defined in claim 21, and in which the means for driving the spindle comprises a ring gear fixedly mounted in coaxial relation to the frame member, and gear means journaled on the frame member in driving relation to the pivot spindle and engaging the ring gear.

24. A control system for a brake for a pneumatic tired aircraft landing wheel which is mounted on a landing gear structure having a limited flexibility, said brake being actuable in response to fluid pressure, the aircraft brakes producing a predetermined maximum normal deflection of the landing gear structure and of the wheel tire and producing a predetermined maximum rate of vehicle deceleration when the aircraft wheels are fully loaded, said system comprising the combination of pressure conduit means normally communicating with the brake, means normally actuable to supply fluid pressure to said conduit means to actuate the brake, valve means in series with said pressure conduit means and actuable to restrict fluid flow therein, an inertially driven element rotatable about an axis, a coaxially rotatable driving element normally driven in accordance with the wheel rotation, a yielding connection between the driving element and the inertially driven element, said yielding connection being yieldable in response to a rate of wheel deceleration just exceeding said maximum rate of vehicle deceleration, and being yieldable through an angular range greater than the angle of wheel rotation that corresponds to said maximum deflection of the landing gear structure and wheel tire upon brake application, first sensing means responsive to yielding of said yielding connection through a first critical angle less than said angle of wheel rotation, second sensing means responsive to yielding of said yielding connection through a second critical angle greater than said angle of wheel rotation, means for actuating said valve means under control of the first sensing means, and means for releasing the brake under control of the second sensing means.

References Cited in the file of this patent

UNITED STATES PATENTS

| | | |
|---|---|---|
| 2,068,370 | Bush | Jan. 19, 1937 |
| 2,113,618 | Hewitt | Apr. 12, 1938 |
| 2,140,620 | Farmer | Dec. 20, 1938 |
| 2,159,778 | Bush | May 23, 1939 |
| 2,308,500 | Eksergian | Jan. 19, 1943 |
| 2,363,611 | Newell | Nov. 28, 1944 |
| 2,447,709 | McCune | Aug. 24, 1948 |
| 2,519,124 | Eksergian | Aug. 15, 1950 |
| 2,626,998 | Coombes | Jan. 27, 1953 |
| 2,631,696 | Yarber | Mar. 17, 1953 |
| 2,744,699 | Lucien | May 8, 1956 |